United States Patent
Kino

(10) Patent No.: US 9,892,497 B2
(45) Date of Patent: Feb. 13, 2018

(54) IMAGE PROCESSING APPARATUS, IMAGING APPARATUS, AND IMAGE PROCESSING METHOD

(71) Applicant: Olympus Corporation, Shibuya-ku, Tokyo (JP)

(72) Inventor: Tatsuya Kino, Sagamihara (JP)

(73) Assignee: Olympus Corporation, Tokyo (JP)

( * ) Notice: Subject to any disclaimer, the term of this patent is extended or adjusted under 35 U.S.C. 154(b) by 54 days.

(21) Appl. No.: 14/971,446

(22) Filed: Dec. 16, 2015

(65) Prior Publication Data

US 2016/0196640 A1 Jul. 7, 2016

(30) Foreign Application Priority Data

Jan. 6, 2015 (JP) .................. 2015-000814

(51) Int. Cl.
| | |
|---|---|
| *G06T 5/40* | (2006.01) |
| *G06T 5/00* | (2006.01) |
| *H04N 1/60* | (2006.01) |
| *H04N 9/68* | (2006.01) |

(52) U.S. Cl.
CPC ............... *G06T 5/40* (2013.01); *G06T 5/009* (2013.01); *H04N 1/6027* (2013.01); *H04N 9/68* (2013.01); *G06T 2207/20208* (2013.01)

(58) Field of Classification Search
CPC . G06T 5/40; G06T 5/009; G06T 2207/20072; H04N 9/646
See application file for complete search history.

(56) References Cited

U.S. PATENT DOCUMENTS

2010/0329559 A1* 12/2010 Shindo .................... G06T 5/40
382/172

FOREIGN PATENT DOCUMENTS

JP 2010-091949 4/2010

\* cited by examiner

*Primary Examiner* — Twyler Haskins
*Assistant Examiner* — Fayez Bhuiyan
(74) *Attorney, Agent, or Firm* — John C. Pokotylo; Pokotylo Patent Services

(57) ABSTRACT

An image processing apparatus according to the present invention comprises a histogram generating section for generating a histogram by counting a frequency value for each gradation of a predetermined number of gradations as brightness distribution of input image data, a distribution processing section for distributing a count value of the histogram to adjacent gradations, a cumulative histogram generating section for generating a cumulative histogram by accumulating the histograms obtained by the histogram generating section from a low gradation side, and a gradation correction processing section for performing contrast correction by using the cumulative histogram, wherein the distribution processing section fixes a distribution amount to the predetermined number of gradations when distributing the count value to the adjacent gradations.

18 Claims, 19 Drawing Sheets

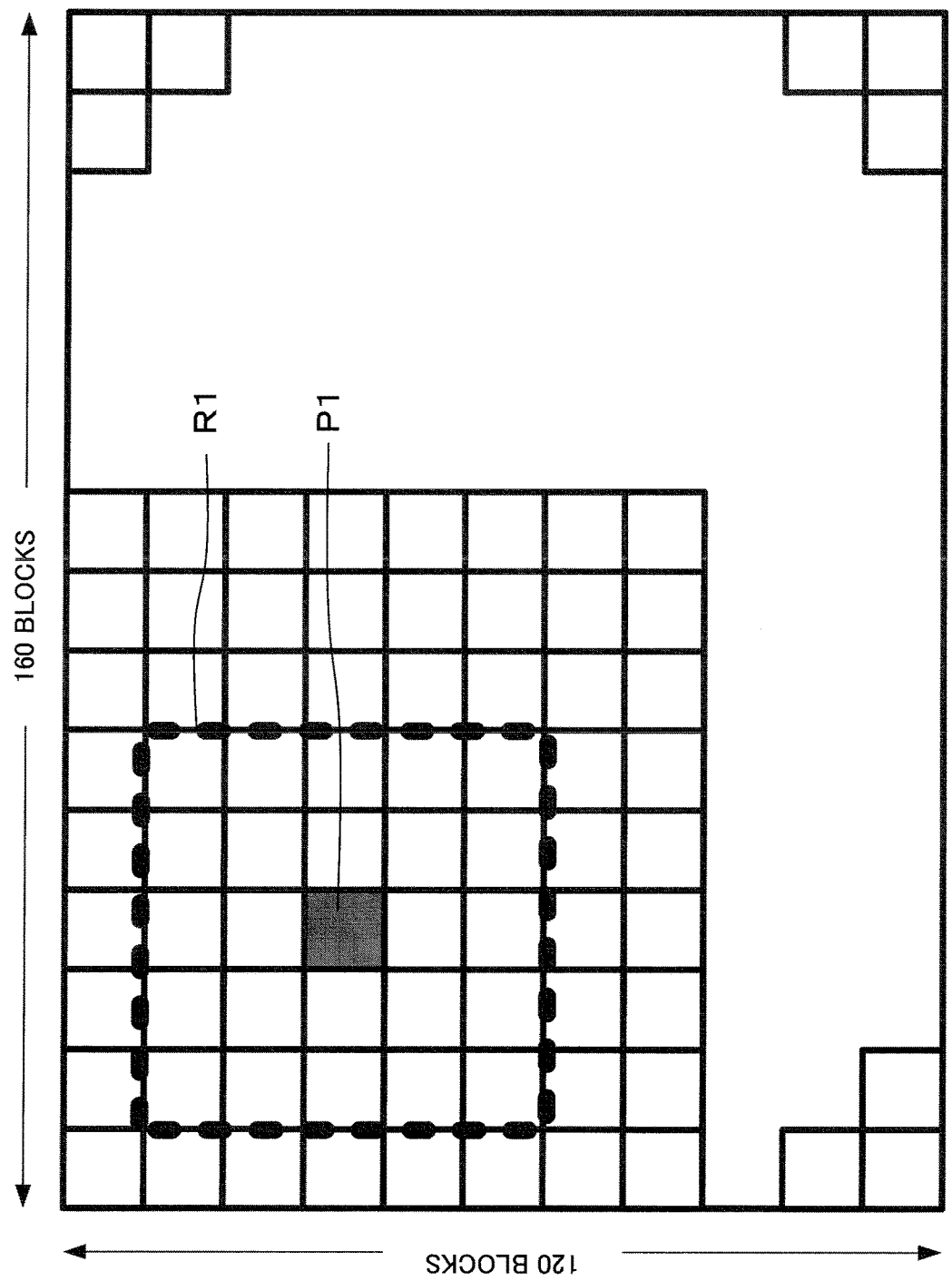

FIG. 8A
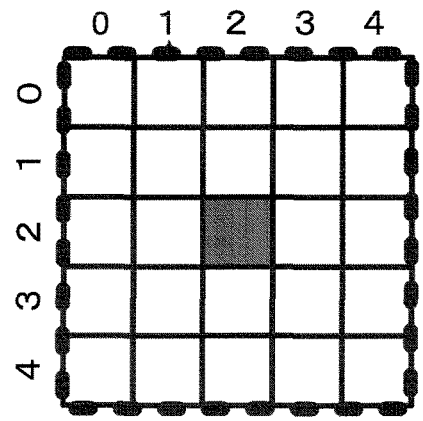
FIG. 8B
| n | PIXEL VALUE | |
|---|---|---|
| 0 | 0 | ~ 511 |
| 1 | 512 | ~ 1023 |
| 2 | 1024 | ~ 1535 |
| 3 | 1536 | ~ 2047 |
| 4 | 2048 | ~ 2559 |
| 5 | 2560 | ~ 3071 |
| 6 | 3072 | ~ 3583 |
| 7 | 3584 | ~ 4095 |
FIG. 8C
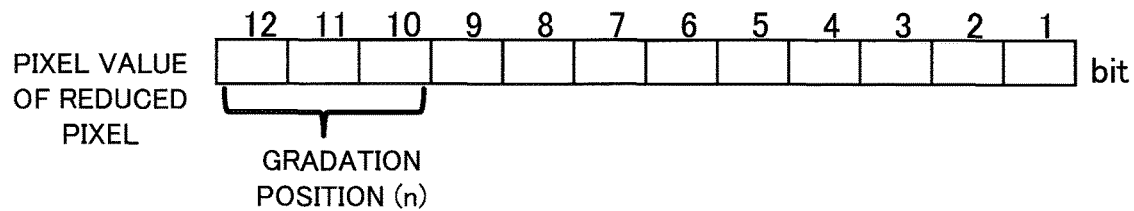

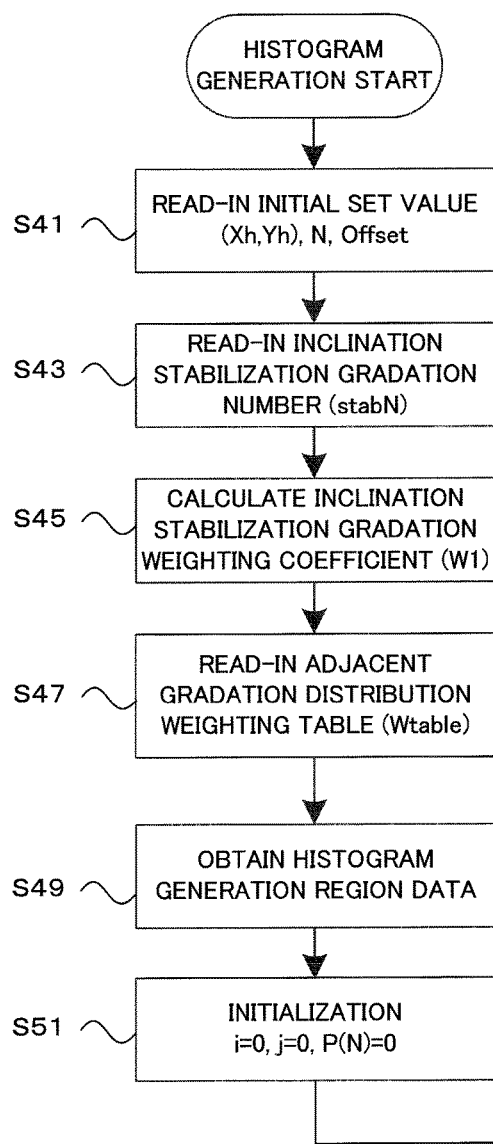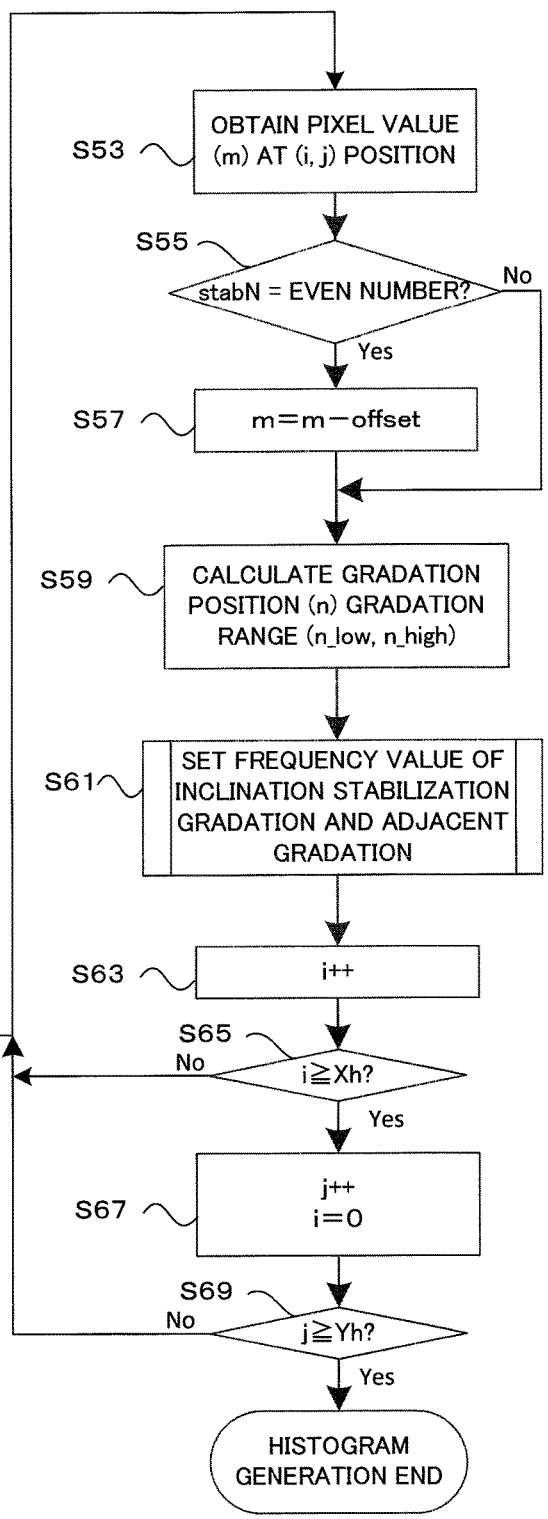
FIG. 9

FIG. 10A  stabN IS ODD NUMBER
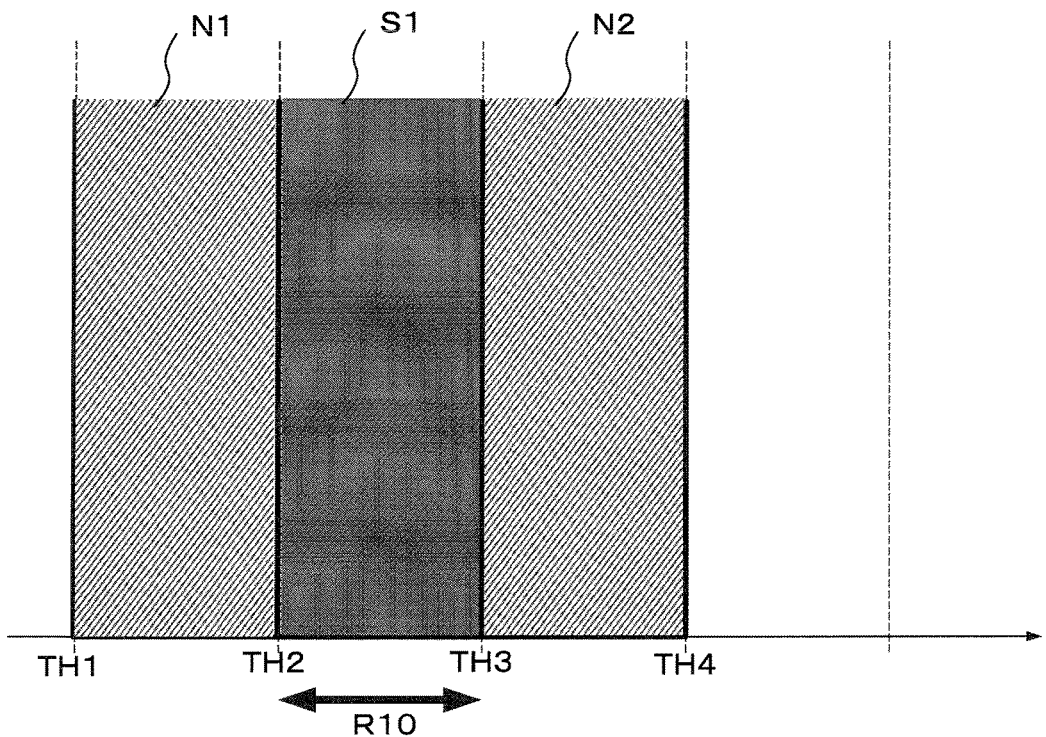
FIG. 10B  tabN IS EVEN NUMBER
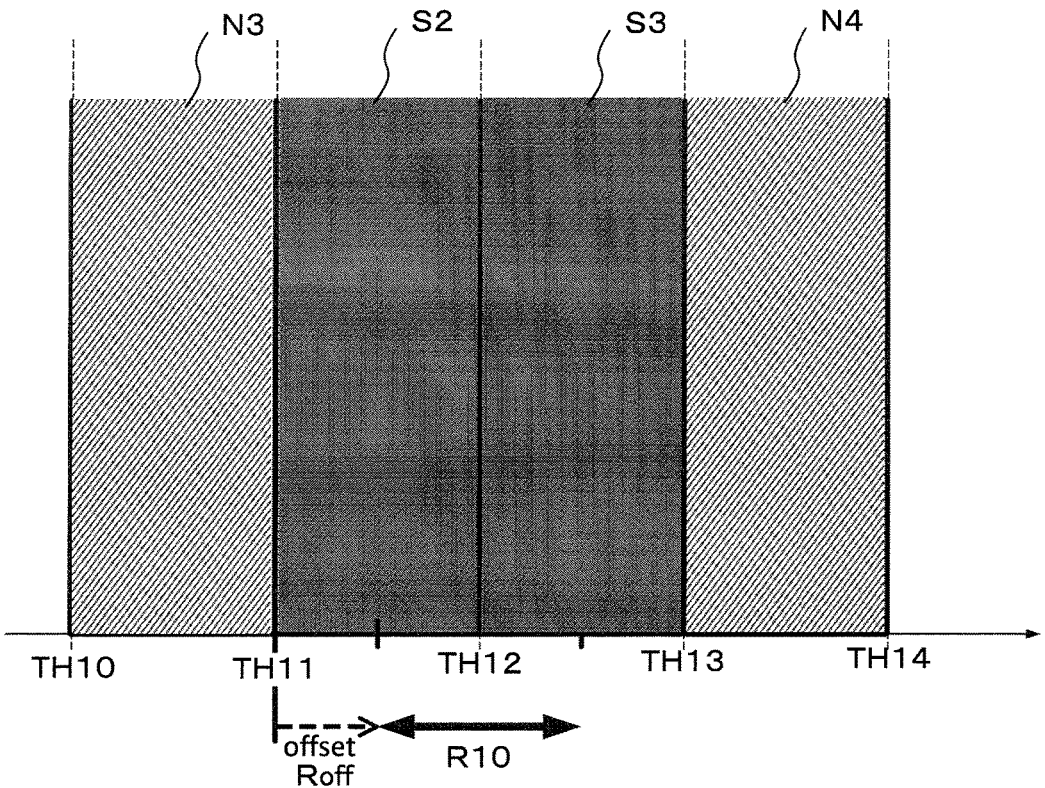

HISTOGRAM

CUMULATIVE HISTOGRAM

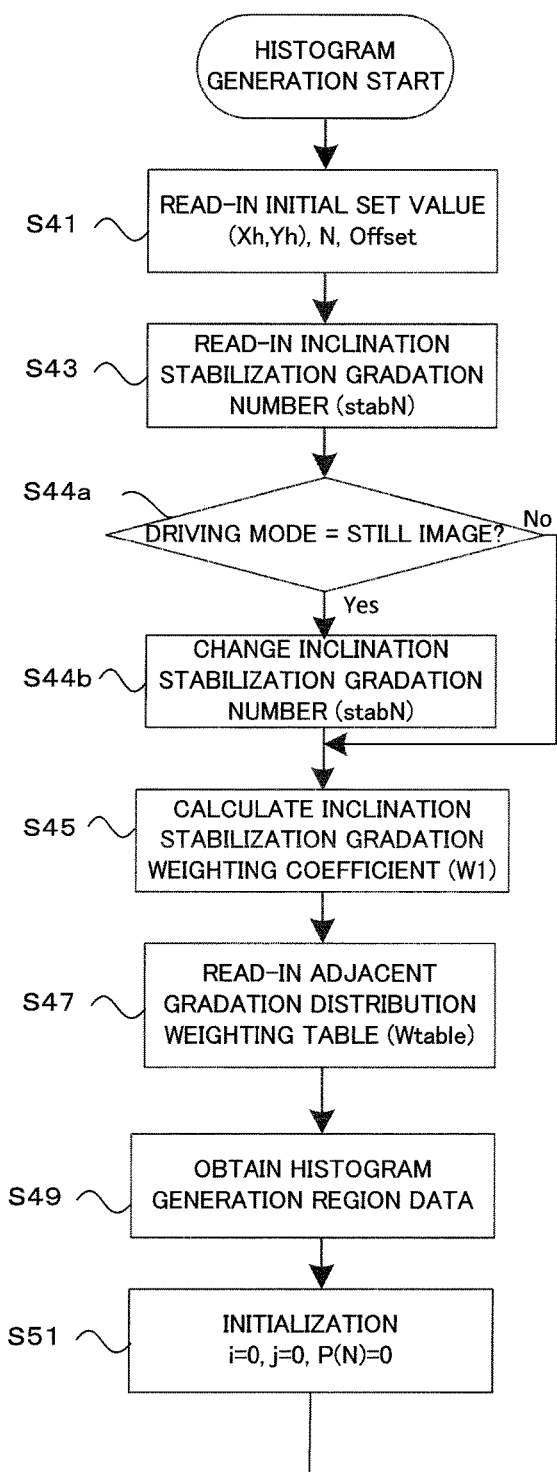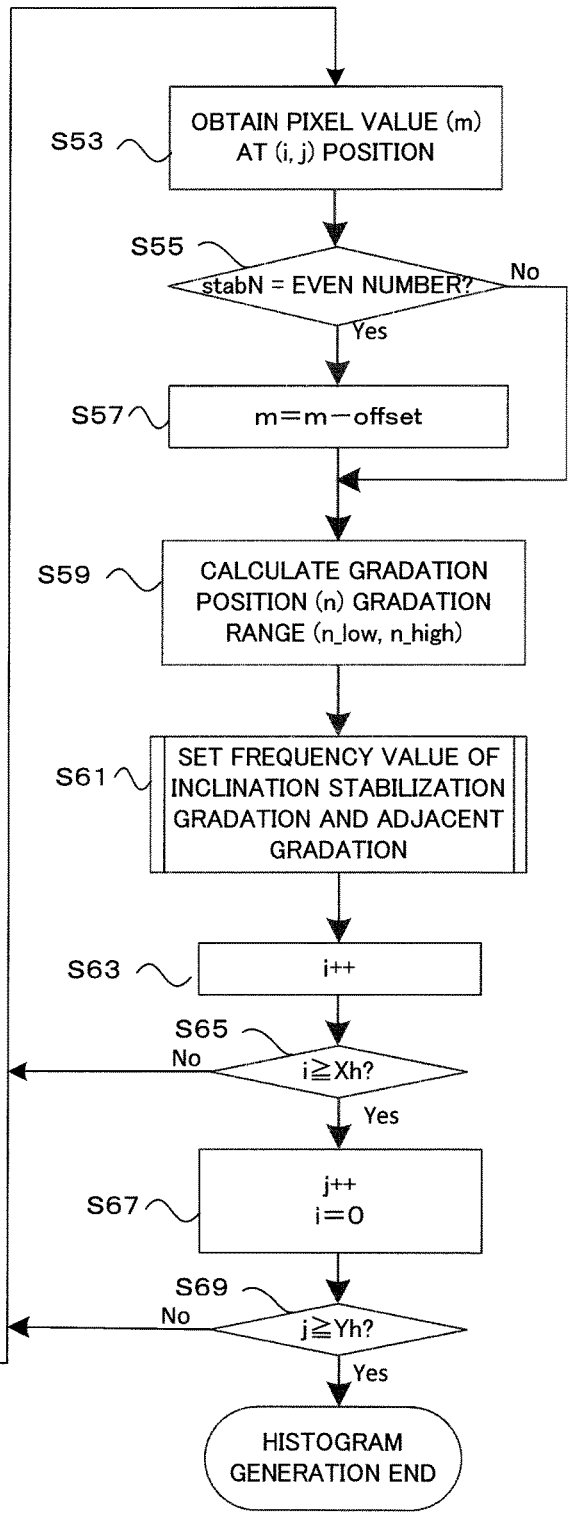
FIG. 14

FIG. 15
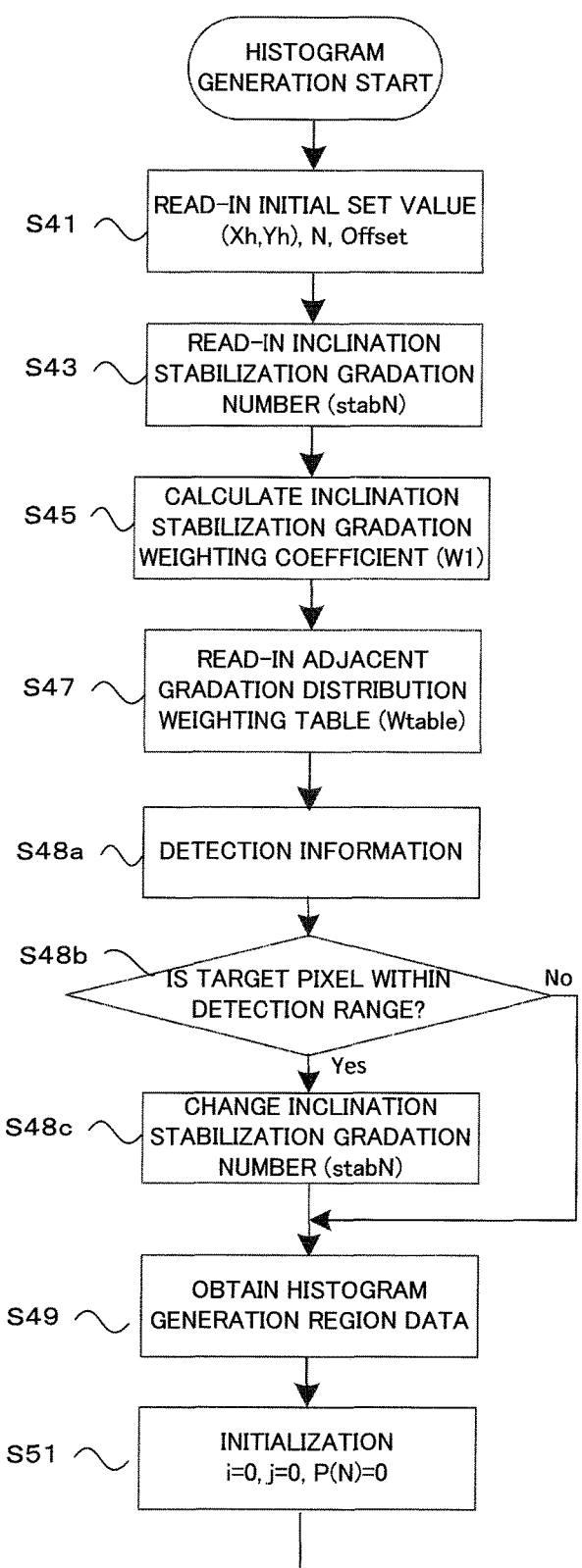
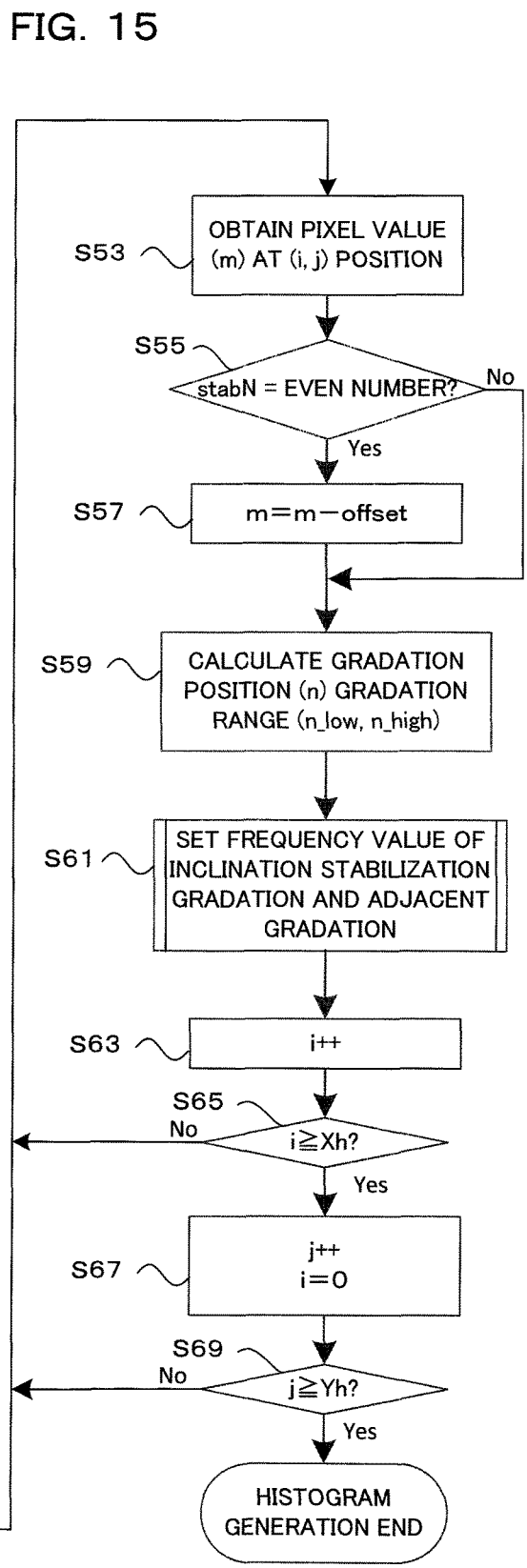

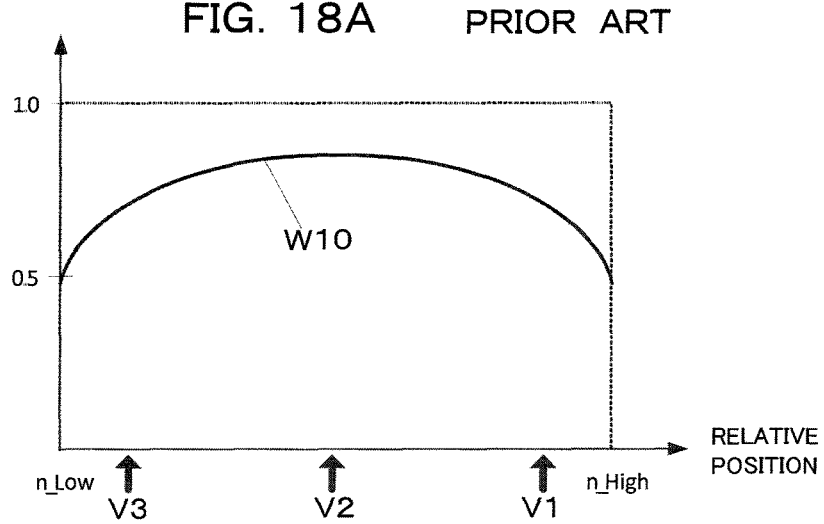
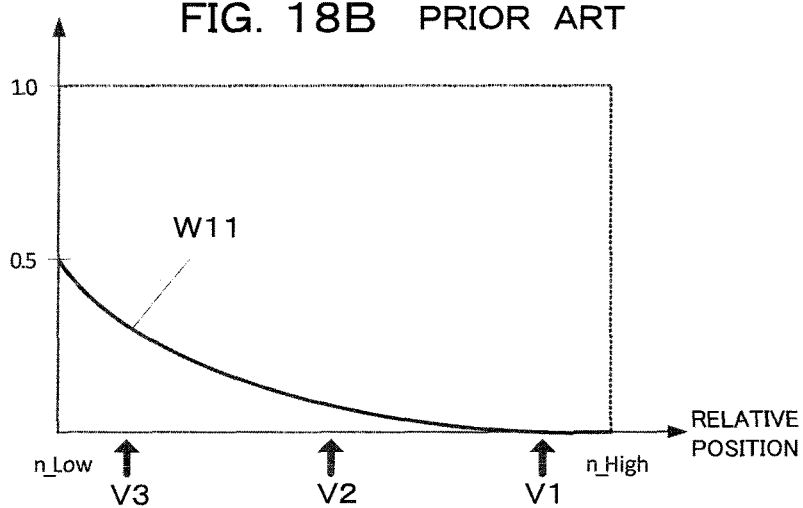
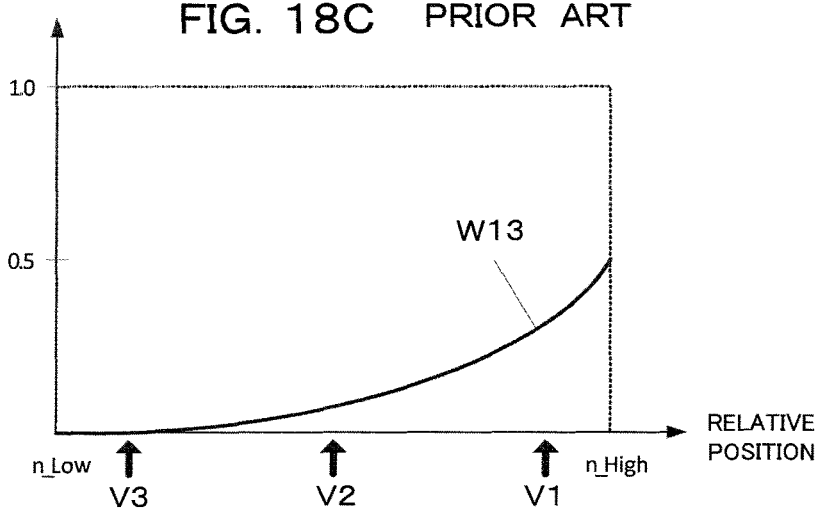

HISTOGRAM

CUMULATIVE HISTOGRAM

IMAGE PROCESSING APPARATUS, IMAGING APPARATUS, AND IMAGE PROCESSING METHOD

Benefit is claimed, under 35 U.S.C. §119, to the filing date of prior Japanese Patent Application No. 2015-000814 filed on Jan. 6, 2015. This application is expressly incorporated herein by reference. The scope of the present invention is not limited to any requirements of the specific embodiments described in the application.

BACKGROUND OF THE INVENTION

1. Field of the Invention

The present invention relates to an image processing apparatus, an imaging apparatus, and an image processing method for generating a cumulative histogram from a histogram of an image and executing gradation conversion processing for performing histogram smoothing.

2. Description of the Related Art

Conventionally, gradation conversion processing in which a cumulative histogram is generated from a histogram of an image and histogram smoothing is executed is known. When the gradation conversion processing is to be executed in an imaging apparatus such as a camera, a histogram is generated with gradations smaller than the number of gradations of an input image using a reduced image, that is, 8 gradations or 16 gradations, for example, and smoothing is performed in order to facilitate processing.

However, if the number of gradations is reduced, when exposure is changed such as a scene change and exposure correction, the histogram is rapidly changed. Particularly, with a flat subject in which the histograms concentrate on a specific gradation, brightness of an image after histogram smoothing becomes brighter or darker, which appears to be an uneven image.

This point will be described by using FIGS. 16A, 16B, 17A, and 17B. In FIGS. 16A and 16B, a pixel value of a reduced image is indicated on a lateral axis, and the gradations are divided into eight parts in this example. If the pixel value is 0 to 4095, for example, a range from 0 to 512 is set to the gradation "0", a range from 512 to 1024 to the gradation "1", and a range from 1024 to 1536 to the gradation "3". Subsequently, they are divided into the gradations "4" to "8" at equal intervals.

In the example in FIGS. 16A and 16B, in the case of a subject of a single plane with uniform brightness over the entire plane, as illustrated in FIG. 16A, the histogram concentrates on a specific gradation. In histogram generating, if the pixel value is contained in a specific range, it is counted as a frequency value of the gradation. That is, in the example illustrated in FIG. 16A, the gradation is divided into 8 gradations from 0 to 7 as described above, and in this example, concentration is found on a gradation n=3.

That is, as illustrated in FIG. 16B, even if the pixel value is V1, V2 or V3, 1 is added to the frequency value of the gradation (n=3) similarly for them all. Thus, in the subject of the single plane with uniform brightness over the entire plane, if further exposure change occurs and the pixel value gradually changes from V1 to V4, the histogram is rapidly switched. That is, for the exposure change from the pixel values V1 to V3, the histogram is not changed (see FIGS. 17A to 17C), but for the exposure change from the pixel values V3 to V4, the histogram is rapidly switched (see FIGS. 17C and 17D). As a result, a rapid change has occurred in the histogram smoothing using the histogram.

Thus, in Japanese Patent No. 5486791 (hereinafter referred to as Patent Literature 1), in frequency value counting at generation of a histogram, such a proposal is made that a weight according to the position in the applicable gradation is calculated and is distributed to the adjacent gradations so as to smoothen a change of the histogram at the exposure change even though the number of gradations is small.

Specifically, on the basis of a pixel value and a relative position in the gradation in which the pixel value is included, a weight as illustrated in FIGS. 18A to 18C is given and distributed to the preceding and subsequent gradations, and the frequency value is counted. A curved line W10 illustrated in FIG. 18A indicates a weight to the frequency value at the corresponding gradation position (n), a curved line W11 illustrated in FIG. 18B indicates a weight to the frequency value at an adjacent position (n−1) of the corresponding gradation position (n), and a curved line W12 illustrated in FIG. 18C indicates a weight to the frequency value of the adjacent position (n+1) of the corresponding gradation position (n).

By giving such weights, as illustrated in FIGS. 19A to 19D, the histogram changes with the exposure change and shows a smooth change. FIG. 19A illustrates a histogram in the case of the pixel value V1 of the reduced image, FIG. 19B shows a histogram in the case of the pixel value V2 of the reduced image, FIG. 19C shows a histogram in the case of the pixel value V3, and FIG. 19D shows a histogram in the case of the pixel value V4 of the reduced image.

By executing the gradation conversion processing proposed in the aforementioned Patent Literature 1, the rapid change of the histogram itself is improved as illustrated in FIGS. 19A to 19D. However, it is insufficient to stably change the result of the histogram smoothing, and brightness of the image of the histogram smoothing can change depending on conditions.

This point will be described by using FIGS. 19E to 19H. Each graph illustrated in FIGS. 19E to 19H shows a cumulative histogram using the histogram in FIGS. 19A to 19D and a state in which the histogram smoothing is performed by using the cumulative histogram as input/output characteristics. Input data shown in lateral axes of the FIGS. 19E to 19H (bidirectional arrows) gradually darkens without any change in a width even if the exposure is changed, while it is found that, in output data after the histogram smoothing shown on a vertical axes (bidirectional arrows), the width is largely changed by the exposure change. That is, in the gradation conversion processing illustrated in Patent Literature 1, a stable result cannot be obtained when local gradation conversion processing using the histogram smoothing is executed. A vertical line close to the center of the bidirectional arrow on the lateral axis indicates an average value.

SUMMARY OF THE INVENTION

The present invention has an object to provide an image processing apparatus, an imaging apparatus, and an image processing method capable of stably changing a result of histogram smoothing.

The image processing apparatus according to the present invention comprising: a histogram generating section for generating a histogram by counting a frequency value for each gradation of a predetermined number of gradations as brightness distribution of input image data; a distribution processing section for distributing a count value of the histogram to adjacent gradations; a cumulative histogram generating section for generating a cumulative histogram by accumulating the histograms obtained by the histogram generating section from a low gradation side; and a gradation correction processing section for performing contrast correction by using the cumulative histogram, wherein the distribution processing section fixes a distribution amount to the predetermined number of gradations when distributing the count value to the adjacent gradations.

The imaging apparatus according to the present invention comprising: an imaging section for imaging a field and outputting image data; a histogram generating section for generating a histogram by counting a frequency value for each gradation of the predetermined number of gradations as brightness distribution of the input image data; a distribution processing section for distributing a count value of the histogram to the adjacent gradations; a cumulative histogram generating section for generating a cumulative histogram by accumulating the histograms obtained by the histogram generating section from a low gradation side; and a gradation correction processing section for performing contrast correction by using the cumulative histogram, wherein the distribution processing section fixes a distribution amount to the predetermined number of gradations when distributing the count value to the adjacent gradations.

The image processing method according to the present invention comprising: a histogram generating step of generating a histogram by counting a frequency value for each gradation of a predetermined number of gradations as brightness distribution of input image data; a distribution processing step of distributing a count value of the histogram to adjacent gradations; a cumulative histogram generating step of generating a cumulative histogram by accumulating the histograms obtained by the histogram generating step from a low gradation side; and a gradation correction processing step of performing contrast correction by using the cumulative histogram, wherein the distribution processing step fixes a distribution amount to the predetermined number of gradations when distributing the count value to the adjacent gradations.

BRIEF DESCRIPTION OF THE DRAWINGS

FIG. 4 is a diagram illustrating a range for generating a histogram from the reduced image of the camera according to the embodiment of the present invention.

FIGS. 8A to 8C are diagrams for explaining the histogram generation in the camera according to the embodiment of the present invention, in which FIG. 8A is a diagram illustrating a pixel position of image data used for the histogram generation, FIG. 8B is a table for calculating a gradation position, and FIG. 8C is a diagram illustrating a structure of pixel value data for calculating the gradation position.

FIG. 9 is a flowchart illustrating an operation of the histogram generation of the camera according to the embodiment of the present invention.

FIGS. 10A and 10B are diagrams illustrating a positional relation between inclination stabilization gradation and adjacent gradation if the inclination stabilization gradation number (stabN) is an odd number and an even number in the camera according to the embodiment of the present invention.

FIG. 14 is a first variation of a flowchart illustrating the operation of the histogram generation of the camera according to the embodiment of the present invention.

FIG. 15 is a second variation of a flowchart illustrating the operation of the histogram generation of the camera according to the embodiment of the present invention.

FIGS. 18A to 18C are diagrams for explaining sorting of the pixel value to the adjacent gradation in the prior-art smoothing processing.

DETAILED DESCRIPTION OF THE PREFERRED EMBODIMENTS

An example in which the present invention is applied to a digital camera as an embodiment will be described below. This digital camera has an imaging section and uses this imaging section to image a subject field and converts it to image data and performs live-view display of the subject image on a display section arranged on a rear surface of a body on the basis of this converted image data. A photographer observes the live-view display and determines a composition and a shutter chance. In a releasing operation, the image data is recorded in a recording medium. The image data recorded in the recording medium can be reproduced/displayed on the display section by selecting a reproduction mode.

Figure 1:
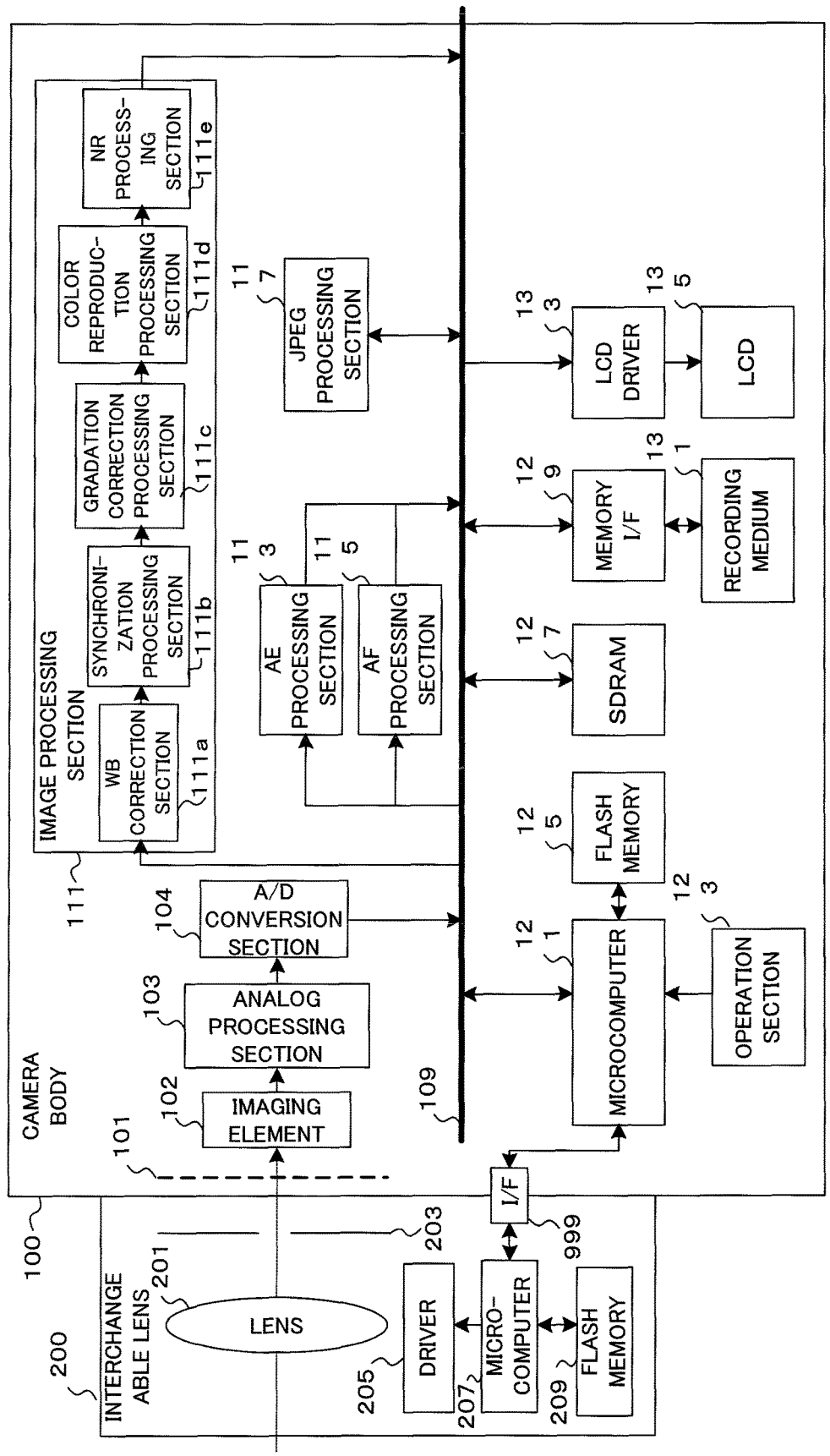
FIG. 1 is a block diagram illustrating mainly electrical configuration of a camera according to an embodiment of the present invention.

FIG. 1 is a block diagram illustrating mainly electrical configuration of the camera according to the embodiment of the present invention. This camera is constituted by a camera body 100 and an interchangeable lens 200 that can be detachably attached thereto.

The interchangeable lens 200 has a photographing lens 201, a diaphragm 203, a driver 205, a microcomputer 207, and a flash memory 209 and has an interface (hereinafter referred to as an I/F) 999 between it and the camera body 100 which will be described later.

The photographing lens 201 is an optical lens for forming a subject image and has a single-focus lens or a zoom lens. On the rear of an optical axis of this photographing lens 201, a diaphragm 203 is arranged, and the diaphragm 203 has a variable aperture and limits a subject flux having passed through the photographing lens 201.

Moreover, the photographing lens 201 can be moved to an optical axis direction by the driver 205, and a focusing position of the photographing lens 201 is controlled on the basis of a control signal from the microcomputer 207. Moreover, if the photographing lens 201 is a zoom lens, a focal distance can be also adjusted. This driver 205 also controls the aperture of the diaphragm 204.

The microcomputer 207 connected to the driver 205 is connected to the I/F 999 and the flash memory 209. The microcomputer 207 operates in accordance with a program stored in the flash memory 209, conducts communication with the microcomputer 121 in the camera body 100 which will be described later, and controls the interchangeable lens 200 on the basis of the control signal from the microcomputer 121.

The flash memory 209 stores various types of information such as optical characteristics, adjustment values and the like of the interchangeable lens 200 in addition to the aforementioned program. The I/F 999 is an interface for conducting communication between the microcomputer 207 in the interchangeable lens 200 and the microcomputer 121 in the camera body 100.

In the camera body 100 and on the optical axis of the photographing lens 201, a mechanical shutter 101 is arranged. This mechanical shutter 101 controls passage time of the subject flux, and a known lens shutter or a focal plane shutter is employed. In the rear of this mechanical shutter 101 and at a position where the subject image is formed by the photographing lens 201, an imaging element 102 is arranged.

The imaging element 102 has a photodiode constituting each pixel arranged two-dimensionally in a matrix state, and each photodiode generates a photoelectric conversion current according to a light receiving amount and this photoelectric conversion current is charge-stored by a capacitor connected to each photodiode. On a front surface of each pixel, a Bayer-array color filter is arranged. The Bayer array has a line in which an R pixel and a G (Gr) pixel are alternately arranged in a horizontal direction and a line in which a G (Gb) pixel and a B pixel are alternately arranged and is constituted by alternately arranging the three lines also in a perpendicular direction.

The imaging element 102 is connected to an analog processing section 103, and this analog processing section 103 performs waveform shaping after reducing a reset noise and the like to a photoelectric conversion signal (analog image signal) read out of the imaging element 102 and performs gain-up so as to obtain appropriate brightness. Adjustment of an ISO sensitivity is controlled by adjusting a gain (amplification rate) of the analog image signal in this analog processing section 103.

The analog processing section 103 is connected to an A/D conversion section 104, and this A/D conversion section 104 performs analog-digital conversion of the analog image signal and outputs a digital image signal (hereinafter referred to as image data) to a bus 109.

The bus 109 is a transfer path for transferring various types of data read out or generated in the camera body 100 to an inside of the camera body 100. To the bus 109, in addition to the aforementioned A/D conversion section 104, an image processing section 111, an AE processing section 113, an AF processing section 115, a JPEG processing section 117, a microcomputer 121, an Synchronous Dynamic Random Access Memory (SDRAM) 127, a memory interface (hereinafter referred to as a memory I/F) 129, and a liquid crystal (hereinafter referred to as an LCD) driver 133 are connected.

The image processing section 111 connected to the bus 109 includes a white-balance correction section (hereinafter referred to as a WB correction section) 111a, a synchronization processing section 111b, a color reproduction processing section 111d, a gradation correction processing section 111c, a noise reduction processing section (hereinafter referred to as an NR processing section) 111de and reads out the image data temporarily stored in the SDRAM 127 and applies various types of image processing to this image data.

The WB correction section 111a performs white-balance correction to the image data. The white-balance correction makes correction so that white color is accurately projected in white under a light source with various color temperatures. Since a user sets light source modes such as clear sky, cloudy sky, shade, light bulbs, fluorescent lamps, or an automatic white-balance mode for automatically calculating a white-balance correction amount on the camera side, the white-balance correction is made for the image data in accordance with this setting mode. The WB correction section 111a obtains or detects a WB gain on the basis of the white-balance setting specified by the user and executes gain multiplication to the image data so as to perform the white-balance correction.

The synchronization processing section 111b applies synchronization processing for the image data obtained under the Bayer array to image data constituted by information of R, G, and B per pixel. That is, in the synchronization processing, demosaic processing for converting the image data with the Bayer structure of RGB to three-face data of RGB is executed.

The gradation correction processing section 111c executes γ-correction processing for correcting an entire tone so as to have preferable gradation on the basis of a monitor γ, and also executes local contrast correction processing. This local contrast correction processing has various methods and a typical one is histogram smoothing (histogram equalization). The histogram smoothing will be described later by using FIGS. 2 to 6. Moreover, the gradation correction processing section 111c functions as a gradation correction processing section for performing contrast correction using a cumulative histogram (see S9 and S11 in FIG. 2 which will be described later, for example).

The color reproduction processing section 111d executes processing of adjusting hues of an image such as gamma correction processing and color reproduction processing for changing the hues of the image. The NR processing section 111e executes processing of reducing a noise of the image data by using a filter for reducing a high frequency or by a coring processing and the like.

The image processing section 111 selects each of the sections 111a to 111d and executes each processing as necessary, and the image data subjected to the image processing is temporarily stored in the SDRAM 127 through the bus 109. The image processing section 111 is constituted by various types of hardware such as ASIC (Application Specific Integrated Circuit), DSP (Digital Signal Processor) and a part or the whole thereof may be processed by the microcomputer 121 in a software manner.

The AE processing section 113 measures subject brightness and outputs it to the microcomputer 121 through the bus 109. A dedicated photometry sensor for subject brightness measurement may be provided, but in this embodiment, the subject brightness is calculated by using the image data based on the output of the imaging element 102. The AF processing section 115 extracts a signal of a high frequency component from the image data, obtains a focusing evaluated value by integration processing and outputs it to the microcomputer 121 through the bus 109. In this embodiment, the photographing lens 201 is focused by a so-called contrast method.

The JPEG processing section 117 reads out the image data from the SDRAM 127 at the time of recording of the image data in a recording medium 131, compresses this read-out image data in accordance with a JPEG compression method and temporarily stores this compressed image data in the SDRAM 127. The microcomputer 121 adds a JPEG header required for constituting a JPEG file to the JPEG image data temporarily stored in the SDRAM 127 so as to create a JPEG file and records this created JPEG file in the recording medium 131 through the memory I/F 129.

Moreover, the JPEG processing section 117 also performs expansion of the JPEG image data for image reproduction/display. In expansion, the JPEG file recorded in the recording medium 131 is read out, and expansion processing is applied in the JPEG processing section 117 and then, the expanded image data is temporarily stored in the SDRAM 127. In this embodiment, a JPEG compression method is employed as the image compression method, but the compression method is not limited to that and other compression methods such as TIFF, MPEG, H.264 can be naturally used.

The microcomputer 121 functions as a control section of this entire camera and comprehensively controls various sequences of the entire camera by controlling each section in the camera body 100 and the interchangeable lens 200 in accordance with the program stored in the flash memory 125 which will be described later.

The microcomputer 121 functions as a histogram generating section for counting the frequency value for each gradation of the predetermined number of gradations and generating a histogram as brightness distribution of the input image data (see S5 in FIG. 2 and see FIGS. 7 and 9 which will be described later, for example). Moreover, the microcomputer 121 functions as a distribution processing section for distributing the count value of the histogram to the adjacent gradations (see S53 to S69 of FIG. 9 which will be described later, for example).

Moreover, the microcomputer 121 functions as a cumulative histogram generating section for generating a cumulative histogram by accumulating the histograms obtained by the histogram generating section from the low gradation side (see S7 in FIG. 2 which will be described later, for example). Moreover, when the microcomputer 121 functions as the aforementioned distribution processing section, the microcomputer 121 fixes a distribution amount to the predetermined number of gradations when distributing the count value to the adjacent gradations (see S79 to S83 in FIG. 11 which will be described later, for example).

When the microcomputer 121 functions as the distribution processing section, when an imaging operation of the imaging section is photographing of a still image, the microcomputer 121 sets the gradation number for fixing the distribution amount equal to or smaller than that in the case of photographing of a moving image (see S44a and S44b in FIG. 14 which will be described later, for example). Moreover, the image processing section 111 functions as a detecting section for obtaining an area in the image. Moreover, the image processing section 111 functions as an area determining section for determining whether or not a local region in the image data is in the area detected by the detecting section. Moreover, the aforementioned histogram generating section generates a histogram for each local region in the image data, and the distribution processing section changes the gradation number for fixing the distribution amount if the local region is determined by the area determining section to be within the area (see S48a to S48c in FIG. 15 which will be described later, for example).

When the microcomputer 121 functions as the distribution processing section, it makes distribution so that the distribution amount of fixation becomes W1=1/(stabN+1) using the gradation number to be distributed (see S45 (3) equation in FIG. 9, for example). Moreover, in the distribution processing section, for the gradation adjacent to the gradation for which the distribution amount is fixed, the distribution amount is varied on the basis of the pixel value of the input image to the gradation range to be fixed, and the distribution amount obtained by that is distributed. Moreover, in the distribution processing section, a maximum amount of the distribution amount varied by the pixel value is set to W23=1−(W1×stabN) by using the distribution amount of fixation and the gradation number for which the fixed distribution is made (see S85 in FIG. 11, for example).

To the microcomputer 121, other than the aforementioned I/F 999, the operation section 123 and the flash memory 125 are connected. The operation section 123 includes operating members such as various input buttons and various input keys including a power button, a release button, a moving image button, a reproduction button, a menu button, a cross button, an OK button and the like, detects operation states of these operating members and outputs detection results to the microcomputer 121. The microcomputer 121 executes various sequences according to the operation by the user on the basis of the detection results of the operating members from the operation section 123.

The flash memory 125 is a nonvolatile memory capable of electrical rewriting and stores a program for executing various sequences of the microcomputer 121. The microcomputer 121 executes control of the digital camera on the basis of this program as described above. Moreover, the flash memory 125 stores adjustment values and the like such as initial set values used for the histogram generation (see FIG. 9), (Xh, Yh), N, Offset, inclination stabilization gradation number (stabN), inclination stabilization gradation weighting coefficient (W1), adjacent gradation distribution weighting table (Wtable).

The SDRAM 127 is a volatile memory capable of electrical rewriting for temporary storage of image data and the like. This SDRAM 127 temporarily stores the image data output from the A/D conversion section 104 and the image data processed in the image processing section 111, the JPEG processing section 117 and the like.

The memory I/F 129 is connected to the recording medium 131 and controls writing and reading of the data such as the image data and a header attached to the image data in and out of the recording medium 131. The recording medium 131 is a memory that can be detachably attached to the camera body but this is not limiting and it may be a memory such as a hard disk built in the camera body.

The LCD driver 133 is connected to an LCD 135 and displays the image on the LCD 135 on the basis of the image data read out of the S DRAM 127 or the recording medium 131 and expanded by the JPEG processing section 117. The LCD 135 includes an LCD panel arranged on a rear surface of the camera body 100 or the like and performs image display. The image display includes a rec-view display for displaying the image data to be recorded only for a short time immediately after photographing, reproduction display of an image file of a still image or a moving image recorded in the recording medium 131, and moving image display such as live-view display. In order to display the compressed image data, it is subjected to expansion processing by the JPEG processing section 117 as described above and then, displayed. Moreover, the display section is not limited to the LCD, and other display panels such as an organic EL may be naturally employed.

Subsequently, by using FIGS. 2 to 6, local contrast correction processing using histogram smoothing will be described. FIG. 2 is a flowchart illustrating an operation of the local contrast correction by the histogram smoothing. This flowchart (the same applies to flowcharts illustrated in FIGS. 7, 9, 11, and 14) is executed by the microcomputer 121 which controls each section in the camera in accordance with the program stored in the flash memory 125.

Figure 2:
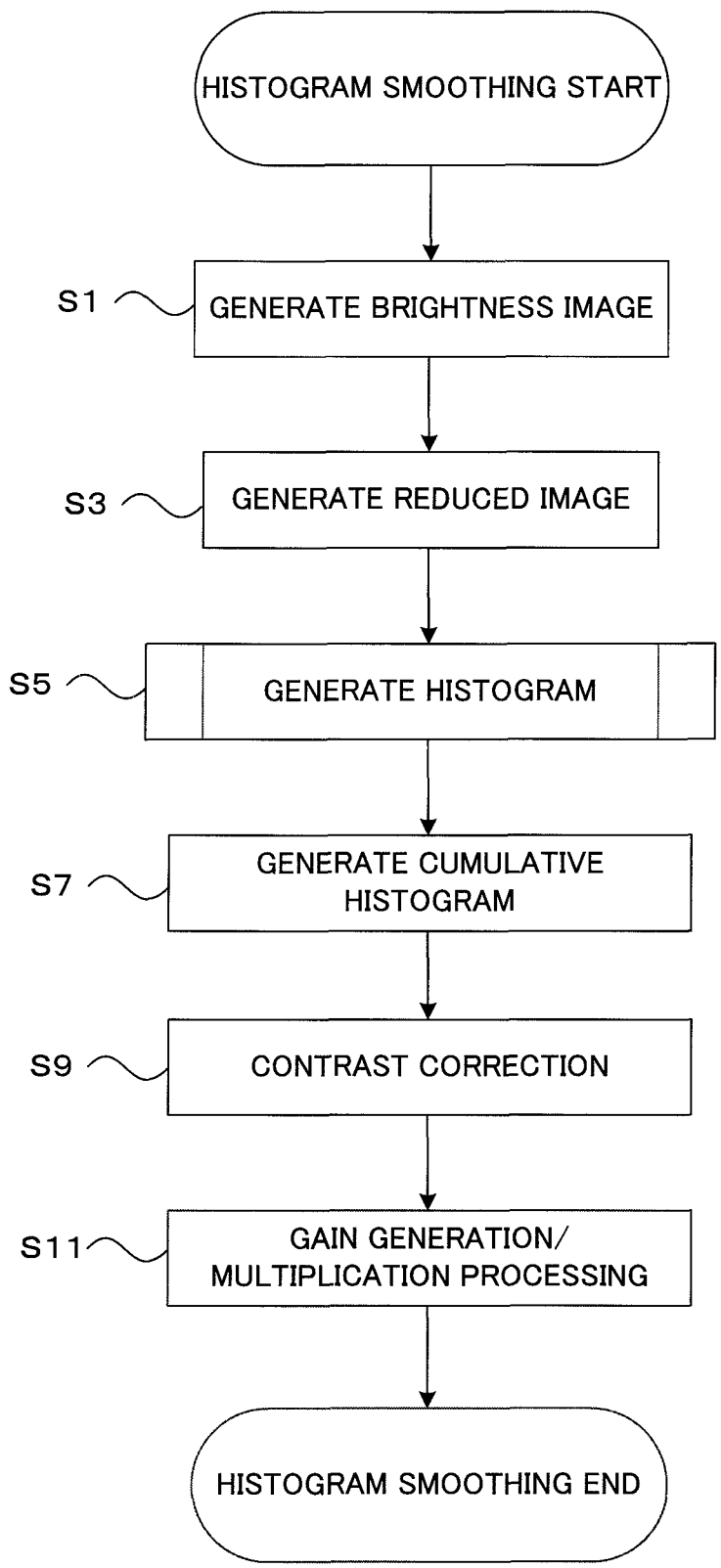
FIG. 2 is a flowchart illustrating an operation of histogram smoothing of the camera according to the embodiment of the present invention.

When the flow of the histogram smoothing illustrated in FIG. 2 is started, first, brightness image generation is performed (S1). Here, the brightness image is generated from RGB image data output from the imaging element 102. Regarding the brightness image, brightness data may be calculated by the following (1) equation, the G image in the RGB image may be used as the brightness image, or the maximum value in each pixel value of R, G, and B may be used as the brightness image.

$$Y=0.299\times R+0.587\times G+0.114\times B \quad (1)$$

Figure 3:
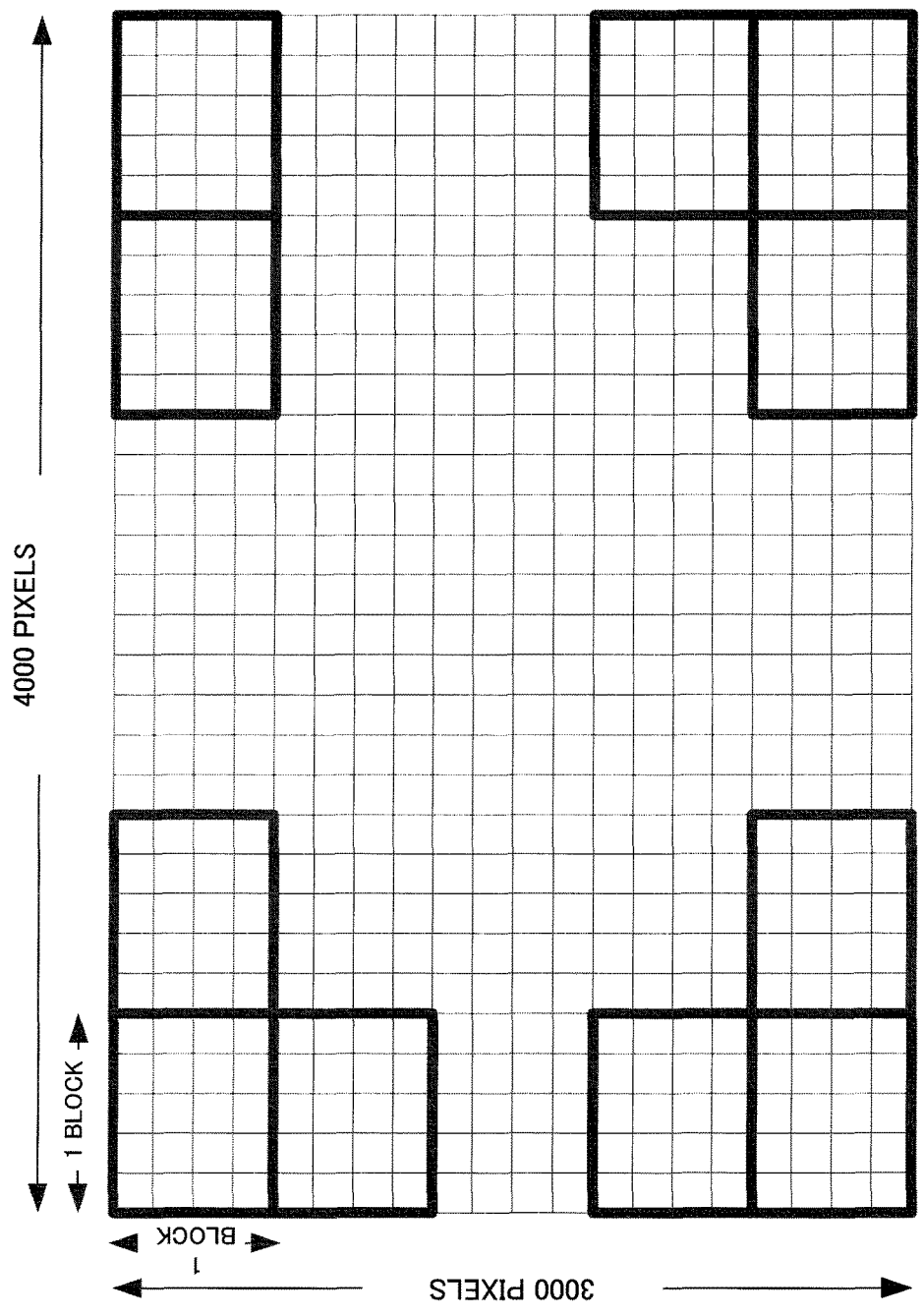
FIG. 3 is a diagram illustrating a block for generating a reduced image from a brightness image from an imaging element of the camera according to the embodiment of the present invention.

When the brightness image is generated, then, generation of a reduced image is performed (S3). Here, in the brightness image generated at step S1, a predetermined region is additionally averaged so as to generate the reduced image. FIGS. 3 and 4 illustrate an example in which the reduced image is generated from the brightness image. In this example, a brightness image of lateral 4000 pixels and vertical 3000 pixels is output from the imaging element 102, and from this brightness image, an inside of a region (block) of lateral 160 pixels and vertical 120 pixels is additionally averaged, respectively, so as to generate the reduced image. After this, one block of the reduced image of 160×120 is expressed as one pixel of the reduced image. These numeral values are exemplification and may be changed as appropriate.

The generation of this reduced image may be performed such that, when the image data is read out of the imaging element 102, the analog processing section 103 performs additional averaging for each block and outputs a reduced image. Moreover, the image data digitized by the A/D conversion section 104 may be subjected to additional averaging for each block by the image processing section 111 or the microcomputer 121 so as to generate the reduced image.

Figure 5B:
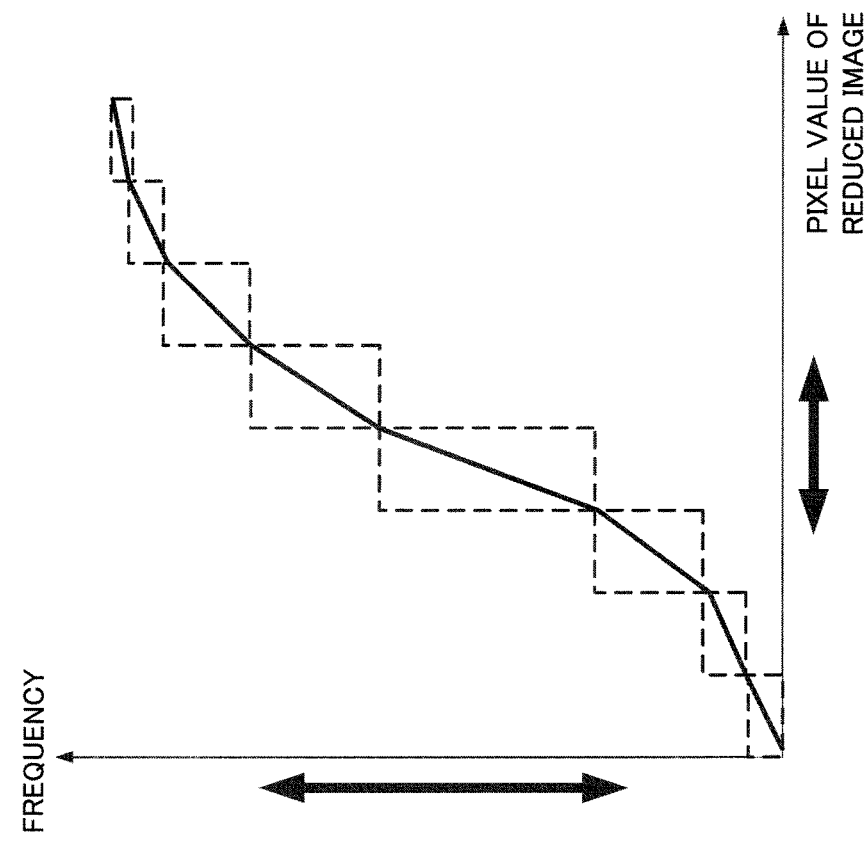
FIGS. 5A and 5B are a histogram generated from the reduced image and a graph illustrating a cumulative histogram in the camera according to the embodiment of the present invention.
Figure 5A:
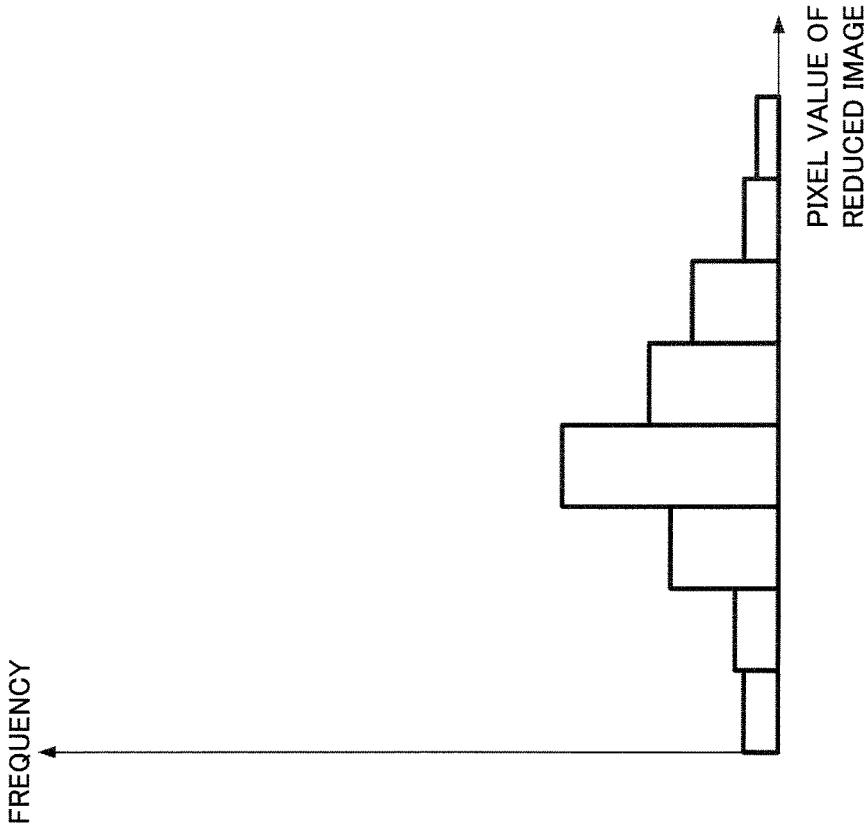

When the reduced image is generated, then, histogram generation is performed (S5). Here, the microcomputer 121 generates a histogram for each pixel of the reduced image. When a histogram is generated for a target pixel P1 (pixel indicated in gray in FIG. 4), a histogram is generated by using a pixel value of a predetermined range R1 (region of a broken line in FIG. 4) including the periphery thereof. An example of the histogram obtained as above is illustrated in FIG. 5A. In this example, in what range of eight values the pixel value of the reduced image is contained is determined, and a histogram with eight gradations is generated. Details of the histogram generation will be described later by using FIGS. 7 and 8.

When the histogram is generated, then, a cumulative histogram is generated (S7). Here, the cumulative histogram is generated on the basis of the histogram generated at step S5 by the microcomputer 121. The cumulative histogram is characteristics obtained when the frequency value of each gradation of the histogram is cumulatively added. FIG. 5B illustrates the cumulative histogram corresponding to the example of FIG. 5A.

When the cumulative histogram is generated, then, contrast correction is performed (S9). Here, the gradation correction processing section 111c performs the contrast correction on the basis of the cumulative histogram generated at step S7. One pixel of the reduced image corresponds to one predetermined region in the brightness image before reduction as illustrated in FIG. 4. Thus, assuming that variation in the pixel values included in the predetermined region in FIG. 4 is within a range of a bidirectional arrow indicted on the lateral axis in FIG. 5B, by converting the characteristics of this cumulative histogram into a characteristic curve of input/output, it is corrected to a range of a bidirectional arrow indicated on the vertical axis in FIG. 5B.

That is, the contrast is corrected, and in the example illustrated in FIGS. 5A and 5B, the contrast is highlighted. That is, since the range of the arrow of the vertical axis (pixel value after correction) is larger than the range of the arrow of the lateral axis (pixel value), contrast is highlighted. Therefore, the contrast correction according to the histogram illustrated in FIG. 5A can be made. By executing this processing for each predetermined region (each local region), it becomes the local contrast correction processing.

Figure 6:
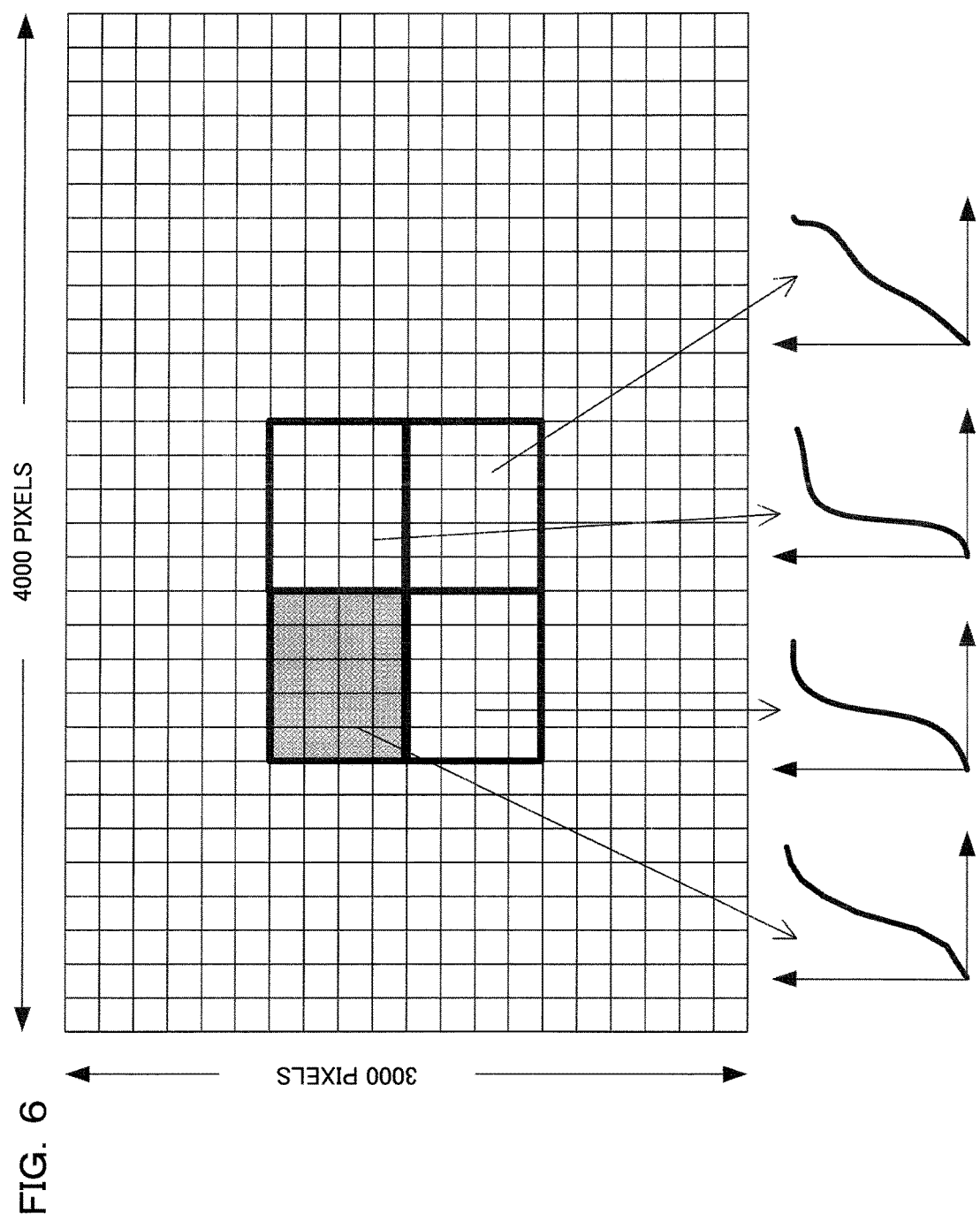
FIG. 6 is a graph illustrating an example in which contrast correction is also performed using the nearby cumulative histogram in the camera according to the embodiment of the present invention.

When the local contrast correction processing is executed, actually, continuity on a boundary where regions switch is considered, and the contrast correction using the adjacent cumulative histogram as illustrated in FIG. 6 is also executed. By making a result of interpolation processing a contrast correction result, the continuity is maintained.

When the contrast correction is performed at step S9, then, gain generation/multiplication processing is performed (S11). Here, the gradation correction processing section 111c executes the gain generation/multiplication processing by using the result of the contrast correction at step S9. Specifically, in order to adjust correction intensity, by calculating a ratio between the image after the contrast correction obtained at step S9 and the brightness image before the contrast correction illustrated in FIG. 3, a gain value for each pixel is calculated. Then, by multiplying the result obtained by adding a correction intensity adjustment value to this calculated gain value with the RGB image which is input data, a final local contrast correction image is generated.

As described above, in the local contrast correction processing by the histogram smoothing in this embodiment, the cumulative histogram is generated from the histogram, the contrast correction image is generated by using this cumulative histogram, a gain is calculated on the basis of that, and this calculated gain is subjected to multiplication processing of the image data from the imaging element.

Subsequently, an operation of the histogram generation at step S5 (see FIG. 2) will be described. First, by using a flowchart illustrated in FIG. 7, a basic operation of the histogram generation in this embodiment will be described.

Figure 7:
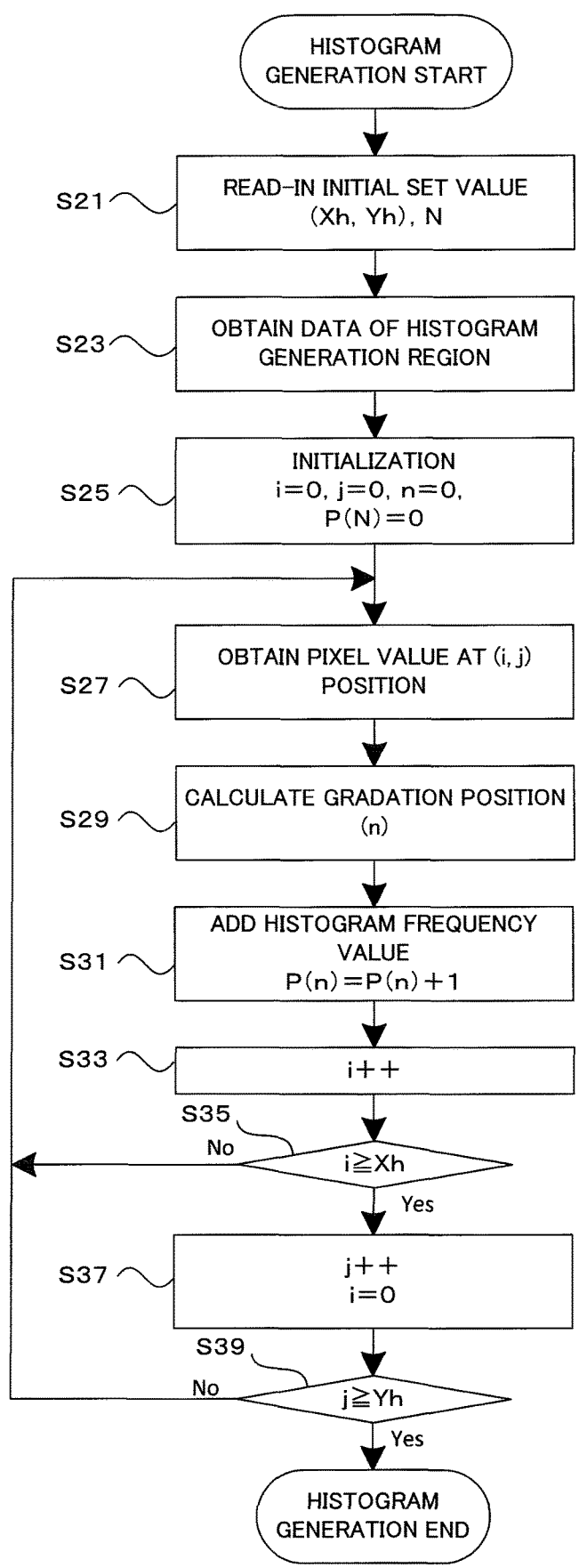
FIG. 7 is a flowchart illustrating a conceptual operation of histogram generation of the camera according to the embodiment of the present invention.

When the flow illustrated in FIG. 7 is started, first, an initial set value is read in (S21). Here, as reading of the initial set value, a region set value (Xh, Yh) for generating the histogram and a gradation number set value (N) of the histogram to be generated are read in. The gradation number set value (N) in the example illustrated in FIG. 5A is N=8.

When the initial set value is read in, then, the histogram generation region data is obtained (S23). The histogram region set value is a region of Xh×Yh around a target pixel. Here, for convenience of description, it is assumed that (Xh, Yh)=(5, 5), N=8 are set. When the region is read in, by using the read-in region set value, image data to be used for the histogram generation is obtained. FIG. 8A illustrates the obtained data of 5×5 pixels.

When the histogram generation region data is obtained, then, initialization is performed (S25). Here, as initialization, a counter (i, j) when the pixel is scanned is initialized to (0, 0) and a variable (n) indicating a gradation position of each pixel and an array P(N) which becomes the histogram are initialized to "0".

After initialization, at steps S27 to S39, the histogram in the set region is generated. First, a pixel value at the (i, j) position is obtained (S27). Here, the pixel value at the (i, j) position is obtained, but at first processing, a pixel value corresponding to the (0, 0) position in the image data illustrated in FIG. 8A is obtained.

When the pixel at the (i, j) position is obtained, then, the gradation position (n) is calculated (S29). Here, when the gradation is divided into N gradations (eight gradations in the exemplification), at what gradation position it belongs is identified by using the pixel value obtained at step S27 and it is made the gradation position (n). Specifically, if the obtained pixel value is 12-bit data (4096 gradations), as identifying means, the gradation position (n) may be calculated on the basis of a table as illustrated in FIG. 8B. Moreover, as illustrated in FIG. 8C, superior 3 bits of the pixel value are read in and the value may be made the gradation position (n).

When the gradation position (n) is calculated, then, addition of the histogram frequency value is performed (S31). Here, 1 as the frequency value is added to the histogram array P(n) corresponding to the gradation position (n) calculated at step S29 (P(n)=P(n)+1). After the histogram frequency value is added, a counter i of the pixel position is incremented (S33).

When the counter i is incremented, whether it is i≥Xh or not is determined (S35). Here, whether the counter i is Xh or more or in the example illustrated in FIG. 8A, whether i is "5" or more is compared. If i is Xh or more, it means that an end in the region in the lateral direction is reached, the routine proceeds to step S37 and movement for 1 pixel is made in the vertical direction, while if it is less than Xh, the pixel value at the (i, j) position according to the i incremented at step S33 is obtained by returning to step S27.

As the result of the determination at step S35, in the case of i≥Xh, the counter j is incremented and the counter i is reset to 0 (S37). Subsequently, whether it is j≥Yh or not is determined (S39). Here, if the counter j is Yh or more, or in the example illustrated in FIG. 8A, if j is "5" or more is compared. As the result of the comparison, if it is less than Yh, the pixel value at the (i, j) position according to j incremented at step S37 is obtained by returning to step S27. On the other hand, if j is Yh or more, the end in the region in the vertical direction is reached, and all the pixels in the region are scanned, and since the histogram frequency value is calculated, the histogram array P (n) at this point of time becomes the histogram result in the histogram region in FIG. 8A.

Subsequently, by using a flowchart illustrated in FIG. 9, an operation of the histogram generation in this embodiment will be described. A portion in common with the flowchart in FIG. 7 will be described simply.

When the flow illustrated in FIG. 9 is started, the initial set value is read in (S41). Here, as the initial set value, in addition to the region set value (Xh, Yh) and the gradation number set value (N) for generating the histogram, an offset amount (offset) to the pixel value is read in. This offset amount corresponds to a value half of a gradation width. For example, if accuracy of the pixel value is 12-bit accuracy and the gradation number set value (N) is 8, a value as in the following (2) equation is obtained.

$$\text{offset}=(4096/8)/2=256 \quad (2)$$

When the initial set value is read in, then, an inclination stabilization gradation number (stabN) is read in (S43). Here, the inclination stabilization gradation number (stabN) stored in the flash memory 125 is read in. The inclination stabilization gradation number (stabN) is setting of the gradation number for keeping inclination of the cumulative histogram constant even if exposure change occurs. If the inclination stabilization gradation number is large, stability can be obtained, but a local contrast effect tends to weaken.

When the inclination stabilization gradation number is read in, then, an inclination stabilization gradation weighting coefficient (W1) is calculated (S45). This weighting coefficient is determined in accordance with the inclination stabilization gradation number (stabN) and is calculated by the following (3) equation. The weighting coefficient may be obtained such that a value calculated in accordance with the inclination stabilization gradation number is stored in the flash memory 125 and read out.

$$W1=1/(\text{stab}N+1) \quad (3)$$

When the inclination stabilization gradation weighting coefficient is calculated, then, an adjacent gradation distribution weighting table (Wtable) is read in (S47). The adjacent gradation is gradation adjacent to the inclination stabilization gradation, and when the frequency value is added to the gradation, this distribution weighting table is used. The adjacent gradation distribution weighting table is stored in the flash memory 125 and this is read out.

When the adjacent gradation distribution weighting table is read in, then, histogram generation region data is obtained (S49). Here, similarly to step S23 (see FIG. 7), the image data of the histogram generation region is obtained by using (Xh, Yh), N read in at step S41.

At step S49, when the histogram generation region data is obtained, then, initialization is performed (S51). Here, similarly to step S25 (see FIG. 7), it is assumed that i=0, j=0, and P(N)=0.

Subsequently, a pixel value (m) at the (i, j) position is obtained (S53). Here, similarly to step S27 (see FIG. 7), a pixel value at the (i, j) position is obtained, but in the case of first processing, a pixel value corresponding to (0, 0) position is obtained.

When the pixel value (m) at the (i, j) position is obtained, then, it is determined whether the stabilization gradation number (stabN)=an even number or not (S55). Here, determination is made on the basis of the stabilization gradation number (stabN) read in at step S43.

As the result of the determination at step S55, if the stabilization gradation number (stabN) is an even number, m=m−offset is calculated (S57). Here, the offset amount (offset) is subtracted from the pixel value (m). The purpose of subtraction of the offset amount is that, if the inclination stabilization gradation number (stabN) is an odd number as illustrated in FIG. 10A, the distribution weight is calculated in the gradation position (n) corresponding to the pixel value, but by further subtracting the offset from that, the even stabilization gradation number can be also processed similarly to the case of the odd number.

That is, FIG. 10A illustrates a case in which stabN is an odd number. In this figure, the lateral axis is the pixel value, the pixel values TH2 to TH3 are a range of the inclination stabilization gradation (stabN=1) S1, and the pixel values TH1 to TH2 and TH3 to TH4 are adjacent gradation regions N1 and N2. This range of the pixel values TH2 to TH3 which is the inclination stabilization gradation (stabN) S1 is a pixel value range R10 for which the distribution weight to the adjacent gradation is calculated.

FIG. 10B illustrates a case in which stabN is an even number. In this figure, too, the lateral axis is the pixel value, the pixel values TH11 to TH12 are a range of the inclination stabilization gradation (stabN=2) S2, the pixel values TH12 to TH13 are within a range of the inclination stabilization gradation (stabN=2) S3, and the pixel values TH10 to TH11 and TH13 to TH14 are adjacent gradation regions N3 and N4. By subtracting the offset amount from the inclination stabilization gradation ranges S2 and S3, the distribution weight to the adjacent gradation can be calculated in the same range as the range R10 of the pixel values TH2 to TH3 which is this inclination stabilization gradation (stabN) S1. That is, even if the stabilization gradation number stabN is an even number, it can be processed with the distribution weight similar to the case of the odd number.

At step S57, when m=m−offset is calculated, or if stabN is not an even number as the result of the determination at step S55, then the gradation range of the gradation position (n) is calculated (S59). Here, the range of the pixel value used for calculation of the gradation position (n) on the basis of the pixel value (m), that is, a lower limit value (n_low) and an upper limit value (n_high) of the pixel value are calculated.

At step S59, the gradation range of the gradation position is calculated and then, the inclination stabilization gradation and the frequency value setting of the adjacent gradation are performed (S61). It will be described in detail by using FIG. 11.

Subsequently, similarly to step S33, the counter i at the pixel position is incremented (S63). When the counter i is incremented, whether it is i≥Xh or not is determined similarly to step S35 (S65). If it is less than Xh, the pixel value at the (i, j) position according to i incremented at step S63 is obtained by returning to step S53. If it is i≥Xh as the result of determination at step S65, the counter j is incremented similarly to step S37, and the counter i is reset to 0 (S67).

Subsequently, similarly to step S39, whether it is j≥Yh or not is determined (S69). If it is less than Yh as the result of the determination, the pixel value at the (i, j) position according to j incremented at step S67 is obtained by returning to step S53. On the other hand, if j is Yh or more, all the pixels in the region have been scanned, and histogram frequency value has been calculated, the histogram array P(n) at this point of time becomes a histogram result in the histogram region.

Subsequently, by using a flowchart illustrated in FIG. 11, details of the inclination stabilization gradation and the frequency value setting of the adjacent gradation at step S61 (see FIG. 9) will be described.

Figure 11:
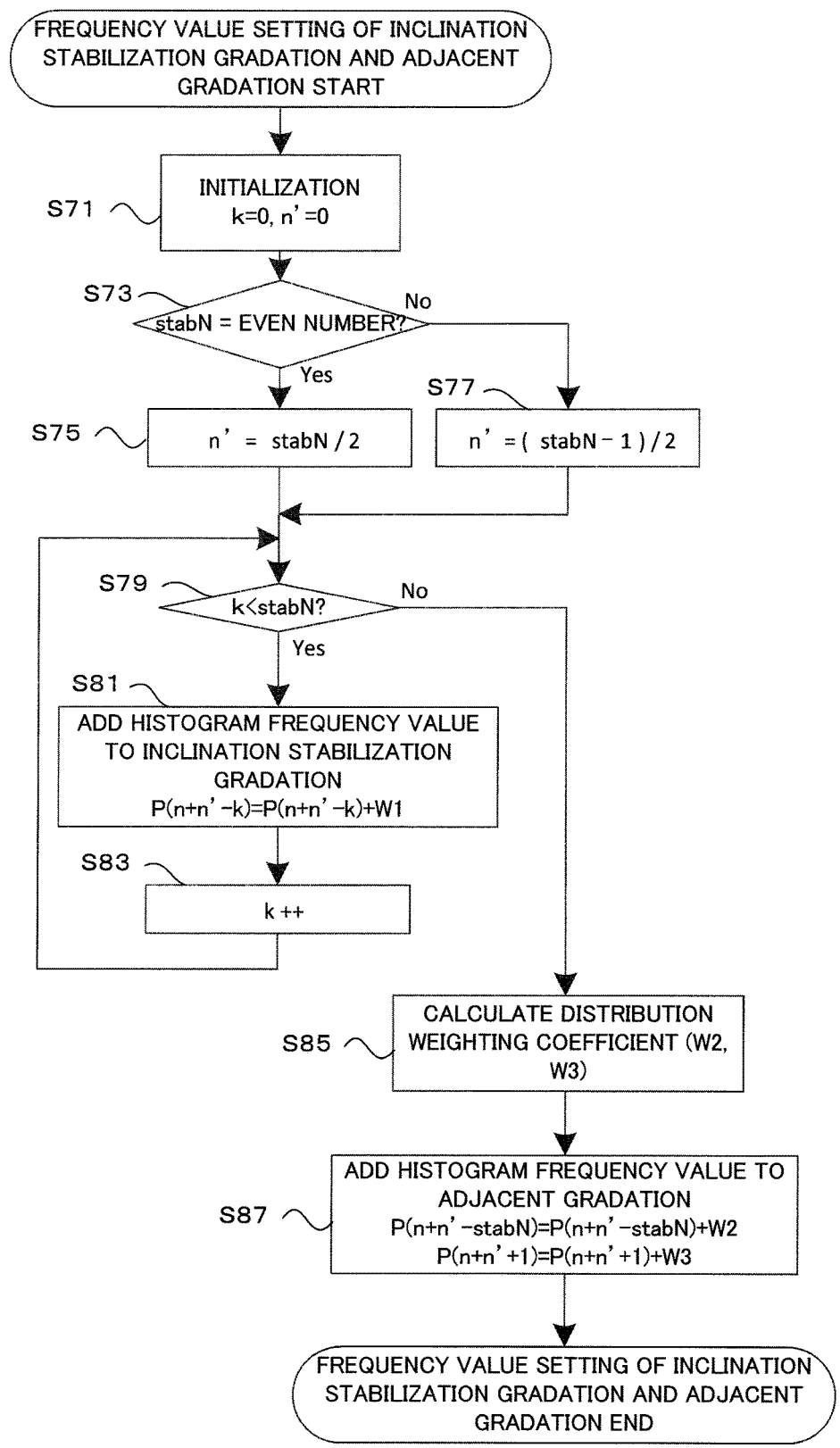
FIG. 11 is a flowchart illustrating an operation of frequency value setting of the inclination stabilization gradation and the adjacent gradation of the camera according to the embodiment of the present invention.

When the flow in FIG. 11 is started, first, initialization is performed (S71). Here, k=0, n'=0 are performed as initialization.

After the initialization is performed, then, it is determined whether the inclination stabilization gradation number (stabN) is an even number or not (S73). Since the inclination stabilization gradation number (stabN) has been read in at step S43 (see FIG. 9), determination is made on the basis of this read-in inclination stabilization gradation number.

If the inclination stabilization gradation number (stabN) is an even number as the result of determination at step S73, n'=stabN/2 is calculated (S75). On the other hand, if the inclination stabilization gradation number (stabN) is an odd number as the result of determination at step S73, n'= (stabN−1)/2 is calculated (S77). This variable n' is used when the inclination stabilization gradation based on the inclination stabilization gradation number (stabN) is set around the gradation position (n) calculated on the basis of the pixel value (m).

When the variable n' is calculated at steps S75 and S77, then, whether it is k<stabN or not is determined (S79). Here, the inclination stabilization gradation number (stabN) read in at step S43 and the variable k are compared. The variable k is initialized to k=0 at step S71 and is incremented at step S83 which will be described later.

If the inclination stabilization gradation number (stabN) is larger than the variable k as the result of determination at step S79, the histogram frequency value is added to the inclination stabilization gradation (S81). Here, as the histogram frequency value to the inclination stabilization gradation, the weighting coefficient (W1) is added to the gradation position (n+n'−k).

At step S81, when the histogram frequency value is added to the inclination stabilization gradation, then, the variable k is incremented (S83). When the variable k is incremented, the routine returns to step S79 and the aforementioned determination is made.

At steps S79 to S83, the value of the variable k is increased until the variable k becomes larger than the inclination stabilization gradation number (stabN).

For example, if the inclination stabilization gradation number (stabN) is "3" and the gradation position (n) is "5", the weighting coefficient (W1) is "0.25", n'=1 from the (3) equation. At that time, since three gradations become the inclination stabilization gradations around the gradation position "5" and thus, "0.25" is added as the histogram frequency value to the gradation positions "4", "5", and "6", respectively.

Moreover, if the inclination stabilization gradation number (stabN) is "2" and the gradation position (n) is "5", the weighting coefficient (W1) is "0.33", n'=1 from the (3) equation. At that time, since two gradations become the inclination stabilization gradations around the gradation position "5" and thus, "0.33" is added as the histogram frequency value to the gradation positions "5" and "6", respectively.

If the variable k becomes larger than the inclination stabilization gradation number (stabN) as the result of determination at step S79, the distribution weighting coefficients (W2, W3) are calculated (S85). The distribution weighting coefficients (W2, W3) are used for addition of the histogram frequency value to the adjacent gradation in the second stage and are calculated by using the distribution weighting table (Wtable) read in at step S47 and the pixel value (m), the gradation position (n), the lower limit value (n_low), and the upper limit value (n_high) read in or calculated from steps S53 to S59.

Figure 12A:
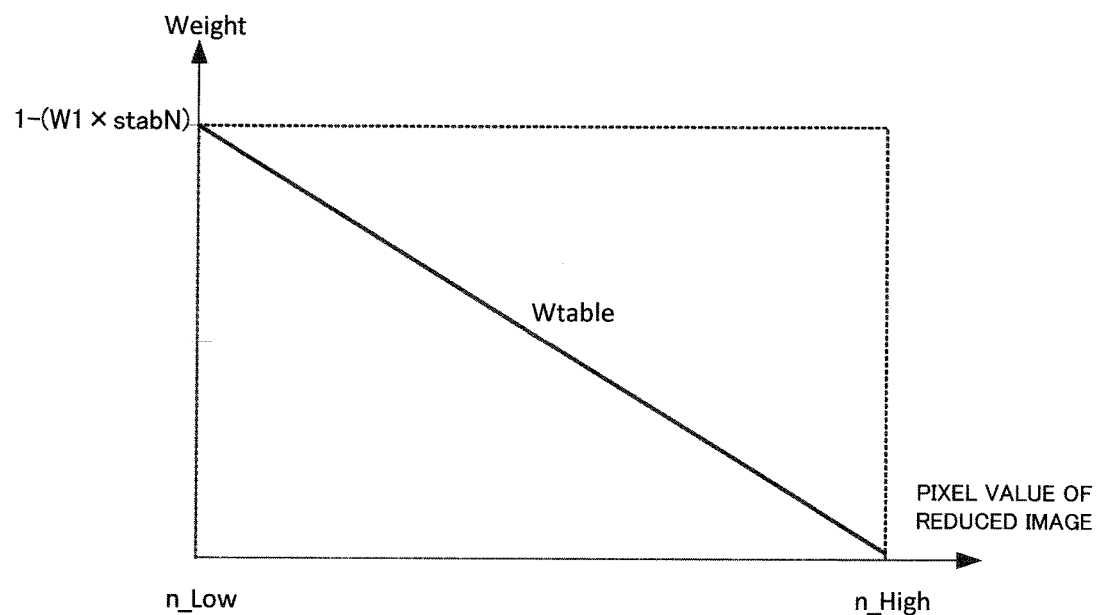
FIGS. 12A and 12B are diagrams illustrating a relation of a distributed weight in each gradation in the camera according to the embodiment of the present invention.

FIG. 12A shows an example of the distribution weighting table (Wtable). As an upper limit of the weighting table, "1−W1×stabN" is set using the weighting coefficient (W1) and the inclination stabilization gradation number (stabN), and as the weight coefficient W2, Weight shown on the vertical axis obtained from the distribution weighting table (Wtable) is used as it is. Moreover, the weighting coefficient W3 is calculated by using the (4) equation below by using Weight shown on the vertical axis obtained from the distribution weighting table (Wtable) and the upper limit value of the table.

$$W3=(1-(W1 \times stabN))-\text{Weight} \quad (4)$$

The weighting coefficient (W2) obtained from the distribution weighting table (Wtable) is the weighting coefficient to the adjacent gradation abutting against a smaller pixel value side with respect to the inclination stabilization gradation, while the weighting coefficient (W3) is the weighting coefficient to the adjacent gradation abutting against a larger pixel value side with respect to the inclination stabilization gradation.

At step S85, when the distribution weighting coefficients (W2, W3) are calculated, then, histogram frequency value addition to the adjacent gradation is performed (S87). Here, by using the distribution weighting coefficients (W2, W3) calculated at step S85, the histogram frequency value to the adjacent gradation is performed by the following (5) and (6) equations. That is, the weighting coefficient (W2) is added to the gradation position (n+n'-stabN), and the weighting coefficient (W3) is added to the gradation position (n+n'+1).

$$P(n+n'\text{-stabN})=P(n+n'\text{-stabN})+W2 \quad (5)$$

$$P(n+n'+1)=P(n+n'+1)+W3 \quad (6)$$

Figure 12B:
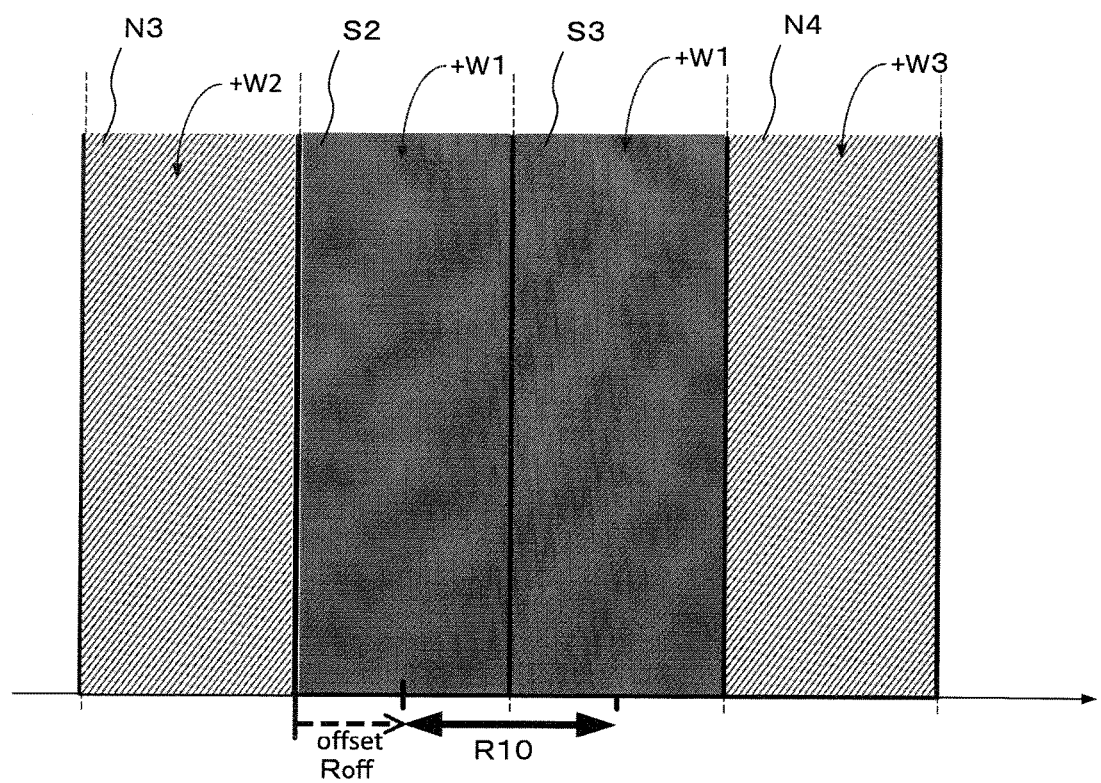

As a result, the total sum (W1×stabN+W2+W3) of all the weighting coefficients becomes "1". As illustrated in FIG. 12B, the weighting coefficient (W1) is added to the inclination stabilization gradations S2 and S3, and the weighting coefficients (W2) (W3) are added to the adjacent gradations N3 and N4. In FIG. 12B, R10 indicates a pixel value range for calculating the distribution weight to the adjacent gradation, while Roff is a value read at step S41 and corresponds to a value half of the gradation width.

Figure 16A:
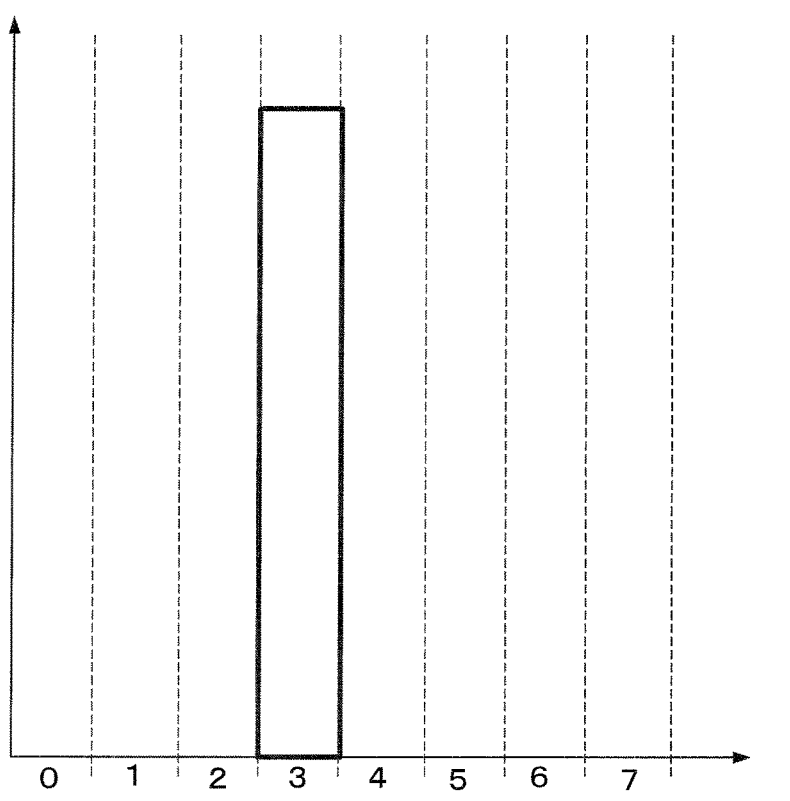
FIGS. 16A and 16B are diagrams for explaining setting of the gradation position in prior-art smoothing processing.
Figure 16B:
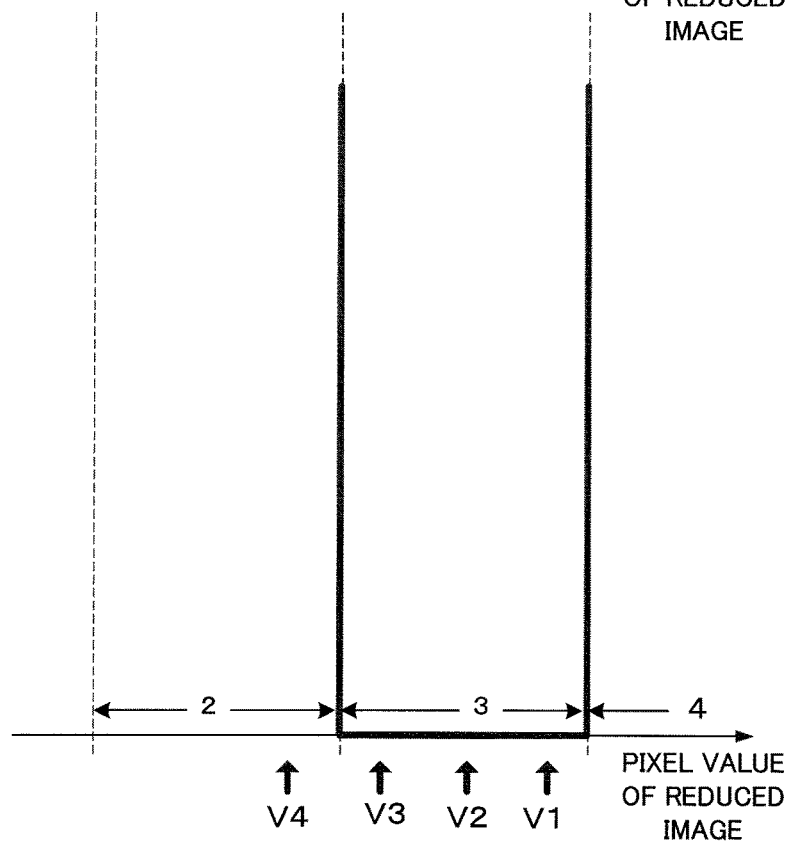
Figure 17A:
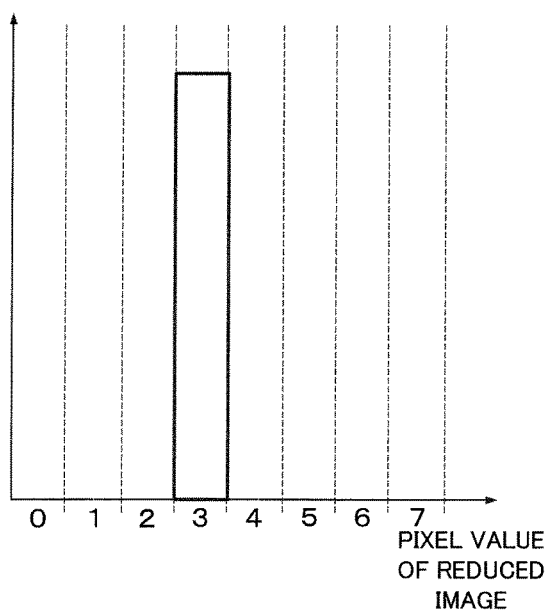
FIGS. 17A to 17D are diagrams for explaining a relation between the pixel value and the gradation position in the prior-art smoothing processing.
Figure 17B:
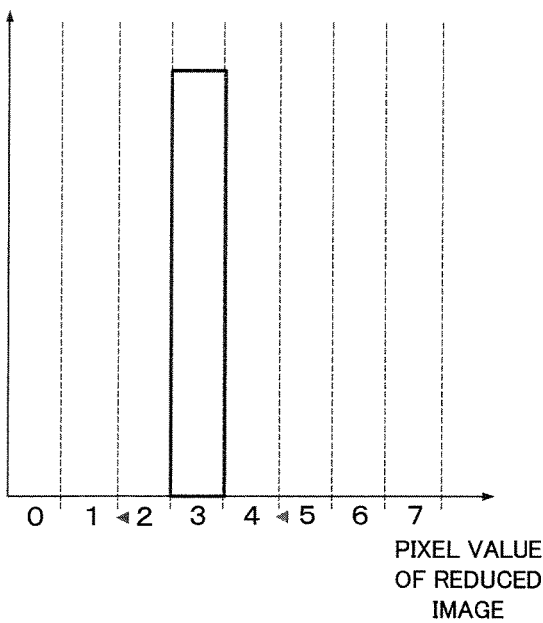
Figure 17C:
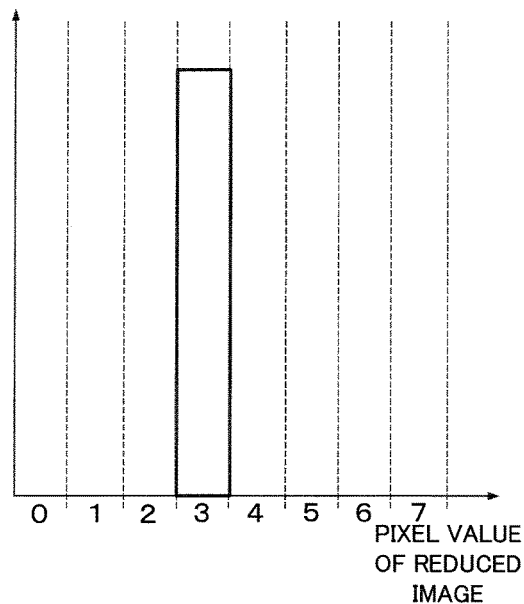
Figure 17D:
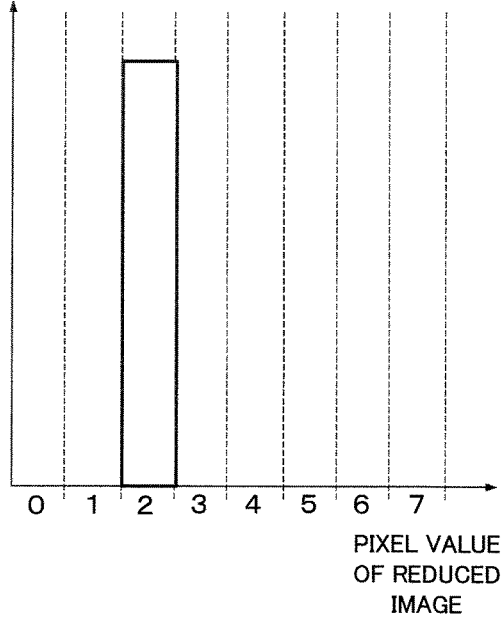
Figure 19A:
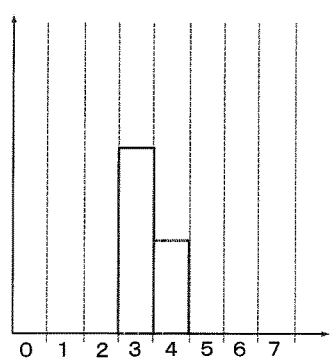
FIGS. 19A to 19H are graphs illustrating the histogram to the pixel value and the cumulative histogram in the prior-art smoothing processing.
Figure 19E:
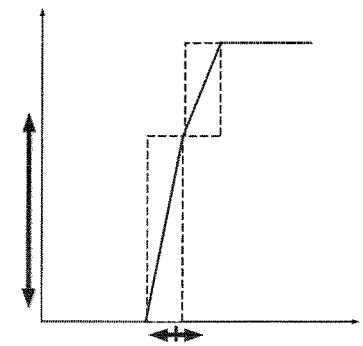
Figure 19B:
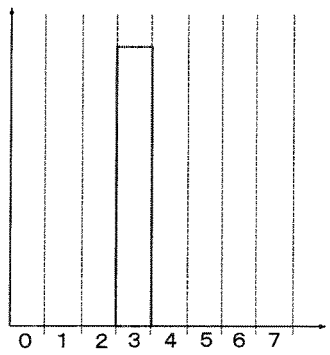
Figure 19F:
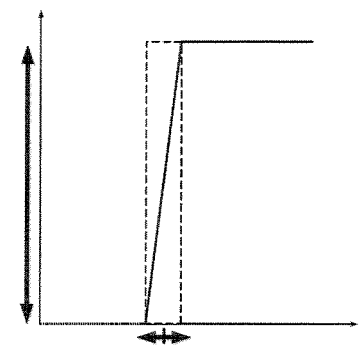
Figure 19C:
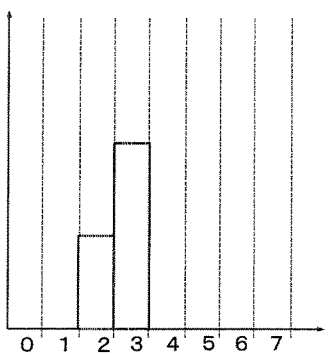
Figure 19G:
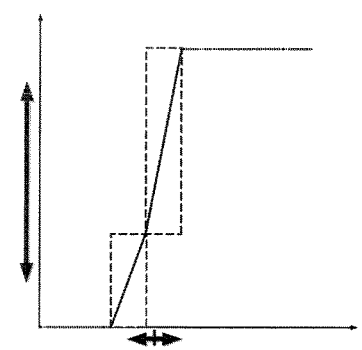
Figure 19D:
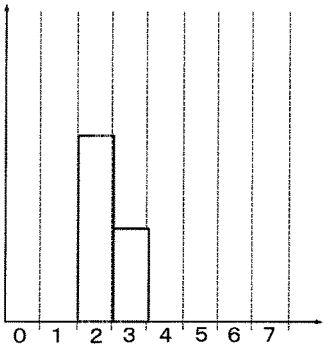
Figure 19H:
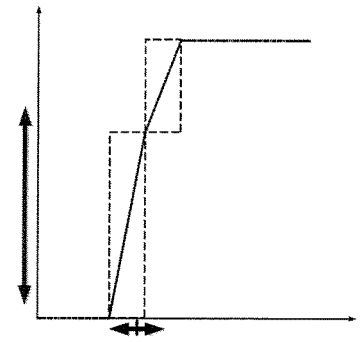

Subsequently, by using FIGS. 13A to 13H, the histogram and the cumulative histogram in this embodiment will be described. FIGS. 13A to 13D on the left side on the figure show histograms corresponding to the pixel values V1 to V4 of the reduced image whose exposure has changed in the subject of the single plane with uniform brightness over the whole surface illustrated in FIG. 16B, while FIGS. 13E to 13H on the right side on the figure show the cumulative histograms corresponding to the pixel values V1 to V4 of the reduced image in FIG. 16B. In the grams shown in FIGS. 13A to 13H, the lateral axis indicates a pixel value of the reduced image and a vertical line close to the center of the bidirectional arrow indicates an average value. Moreover, the vertical axes in FIGS. 13A to 13D indicate the values of the histograms and the vertical axes of FIGS. 13E to 13H indicate the values of the cumulative histograms.

The example illustrated in FIGS. 13A to 13H shows a case in which the inclination stabilization gradation number (stabN) is "1" and the gradation number set value (N) is "8", that is, eight gradations from 0 to 7 are provided. Moreover, the distribution weighting table (Wtable) uses the table illustrated in FIG. 12A. In this case, since the inclination stabilization gradation is one, when the frequency value is added to the gradation position (n) to which the pixel value belongs, the weighting coefficient W1 is added, and when the frequency value is added to the gradation position (n−1), the weighting coefficient (W2) is added, while when the frequency value is added to the gradation position (n+1), the weighting coefficient (W3) is added.

Figure 13A:
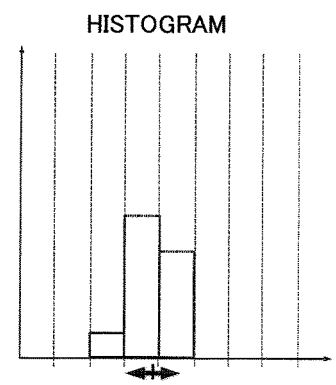
FIGS. 13A to 13H are diagrams for explaining an effect of histogram smoothing in the camera according to the embodiment of the present invention.
Figure 13E:
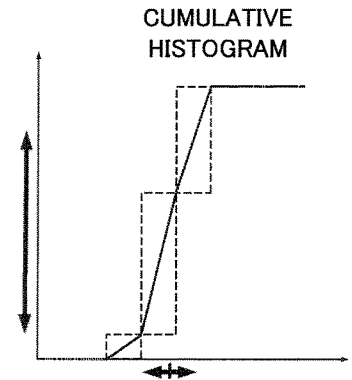

The example illustrated in FIGS. 13A and 13E is a case of the pixel value V1 of the reduced image, and in this example, the gradation position (n)=3 to which the pixel value belongs, and when the weighting coefficient is calculated by using the distribution weighting table illustrated in FIG. 12A based on the relative position of the pixel value in the gradation, it becomes as follows:

The weighting coefficient W1: W1=1/(1+1)=0.5
The weighting coefficient W2: W2=0.1
The weighting coefficient W3: W3=0.4.

From these weighting coefficients, the histograms become as follows:
P(0)=0, P(1)=0, P(2)=0.1, P(3)=0.5, P(4)=0.4, P(5)=0, P(6)=0, P(7)=0.

Figure 13B:
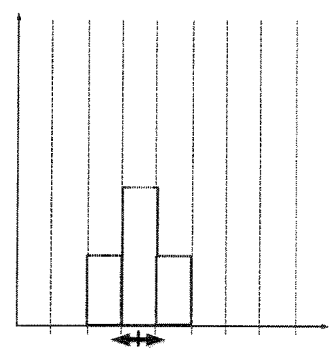
Figure 13F:
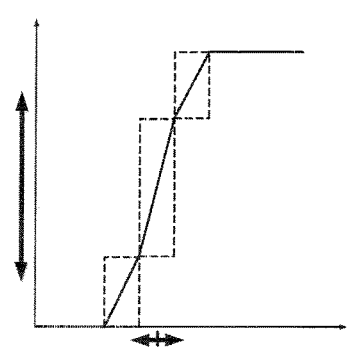

The example illustrated in FIGS. 13B and 13F is a case of the pixel value V2 of the reduced image, and in this example, the gradation position (n)=3 to which the pixel value belongs, and when the weighting coefficient is calculated by using the distribution weighting table illustrated in FIG. 12A based on the relative position of the pixel value in the gradation, it becomes as follows:

The weighting coefficient W1: W1=1/(1+1)=0.5
The weighting coefficient W2: W2=0.25
The weighting coefficient W3: W3=0.25.

From these weighting coefficients, the histograms become as follows:
P(0)=0, P(1)=0, P(2)=0.25, P(3)=0.5, P(4)=0.25, P(5)=0, P(6)=0, P(7)=0.

Figure 13C:
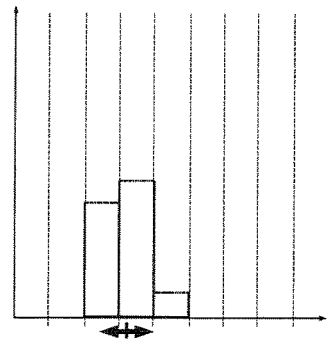
Figure 13G:
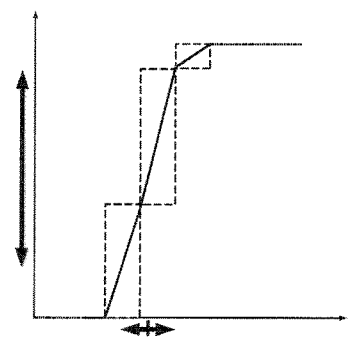

The example illustrated in FIGS. 13C and 13G is a case of the pixel value V3 of the reduced image, and in this example, the gradation position (n)=3 to which the pixel value belongs, and when the weighting coefficient is calculated by using the distribution weighting table illustrated in FIG. 12A based on the relative position of the pixel value in the gradation, it becomes as follows:

The weighting coefficient W1: W1=1/(1+1)=0.5
The weighting coefficient W2: W2=0.4
The weighting coefficient W3: W3=0.1.

From these weighting coefficients, the histograms become as follows:
P(0)=0, P(1)=0, P(2)=0.4, P(3)=0.5, P(4)=0.1, P(5)=0, P(6)=0, P(7)=0.

Figure 13D:
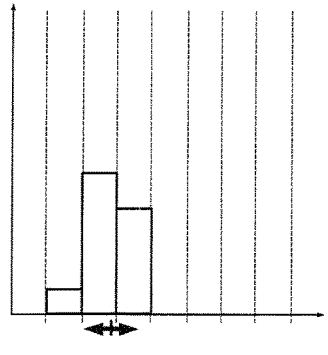
Figure 13H:
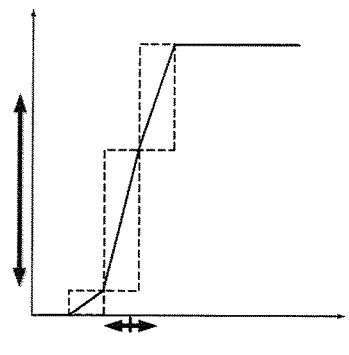

The example illustrated in FIGS. 13D and 13H is a case of the pixel value V14 of the reduced image, and in this example, the gradation position (n)=2 to which the pixel value belongs, and when the weighting coefficient is calculated by using the distribution weighting table illustrated in FIG. 12A based on the relative position of the pixel value in the gradation, it becomes as follows:

The weighting coefficient W1: W1=1/(1+1)=0.5
The weighting coefficient W2: W2=0.1
The weighting coefficient W3: W3=0.4.

From these weighting coefficients, the histograms become as follows:
P(0)=0, P(1)=0.1, P(2)=0.5, P(3)=0.4, P(4)=0, P(5)=0, P(6)=0, P(7)=0.

As described above, in this embodiment, the frequency value is distributed to the preceding and subsequent gradations in accordance with the position of the gradation. Thus, the histogram does not change rapidly. Moreover, in Patent Literature 1, the histogram smoothing processing becomes unstable when the exposure change occurs, but in this embodiment, the inclination stabilization gradation is determined and its frequency value is distributed to the preceding and subsequent gradations in a state fixed to "0.5" in this embodiment. Thus, since the inclination is made stable even when the cumulative histogram is generated, the stable histogram smoothing processing can be executed even if the exposure change occurs.

Subsequently, by using a flowchart illustrated in FIG. 14, a first variation of the histogram generation illustrated in FIG. 9 will be described. This variation is different from the flowchart in FIG. 9 in a point that steps S44a and S44b are added, and since the other steps are the same as those in the flowchart in FIG. 9, mainly the differences will be described.

In the flowchart illustrated in FIG. 9, the inclination stabilization gradation number is set so that photographing of a moving image can be mainly handled. On the other hand, in this variation, handling of a still image driving for generating an image in one shot and handling of a live-view/moving image for generating a video in a plurality of frames can be switched.

When a video is to be created in a plurality of frames, an influence of the histogram smoothing processing caused by the exposure change is remarkably shown. On the other hand, when an image is to be generated by one shot, since the single image completes the creation, there is no influence caused by a difference between frames. Thus, whether or not the driving mode is still image driving is determined, and if it is not the still image driving, that is, in the case of a moving image or a live-view image, the inclination stabilization gradation number (stabN) read in the first stage is used as it is, and in the case of the still image driving, the inclination stabilization gradation number (stabN) is reduced and the local contrast effect is reinforced as compared with the case of the moving image or the live-view.

When a flow illustrated in FIG. 14 is started, the initial set value is read in (S41), and the inclination stabilization gradation number (stabN) is read in (S43). Here, the inclination stabilization gradation number (stabN) to be read in is a value suitable for photographing of the live-view or the moving image. When the inclination stabilization gradation number is read in, then, whether or not the driving mode is a still image is determined (S44a). Since the driving mode is set by a photographer through the operation section 123, determination is made on the basis of this setting state.

If the driving mode is a still image as the result of the determination at step S44a, the inclination stabilization gradation number (stabN) is changed (S44b). Here, the inclination stabilization gradation number (stabN) to be read in is a value suitable for photographing of a still image. In this variation, the flash memory 125 also stores the inclination stabilization gradation number (stabN) suitable for photographing of a still image.

If the inclination stabilization gradation number (stabN) is changed at step S44b, or if the driving mode is not the still image as the result of the determination at step S44a, step S45 and after are executed. This processing is the same as the flow in FIG. 14, and the inclination stabilization gradation and frequency value setting of the adjacent gradation are executed by using the inclination stabilization gradation number (stabN) set at step S43 or S44b.

As described above, in the first variation of the present invention, since the inclination stabilization gradation number (stabN) is switched between the still image and the live-view image/moving image, the processing maintaining stability in the moving image/live-view can be executed while the effect in the still image photographing is maintained.

Subsequently, by using a flowchart illustrated in FIG. 15, a second variation of the histogram generation illustrated in FIG. 9 will be described. This variation is different from the flowchart in FIG. 9 in a point that steps S48a to S48c are added, and since the other steps are the same as those in the flowchart in FIG. 9, mainly the differences will be described.

In the flowchart illustrated in FIG. 9, histogram smoothing processing was executed for each local region for the entire screen. On the other hand, in this variation, when a specific region is detected in the screen, response is switched between inside the detection area and outside the detection area.

Local contrast highlight such as histogram smoothing effectively works on a scene such as a landscape but gives a sense of discomfort to the contrary in the case of the face of a person in some cases. Thus, if detection information obtained by face detection and the like is obtained and a target pixel in generation of the histogram, that is, a center pixel of the histogram generation region is contained in the detection range, the inclination stabilization gradation number (stabN) is increased so as to weaken the local contrast effect, while if it is not contained in the detection range, the inclination stabilization gradation number (stabN) read in the first stage is used as it is. As a result, optimal histogram smoothing processing can be executed in accordance with the subject such as the face of a person, a background, respectively.

Specifically, in the flow in FIG. 15, when the adjacent gradation distribution weighting table is read in at step S47, then, the target pixel obtains the detection information (S48a). Here, it is determined whether a pixel to be a target of the histogram smoothing is a portion of the face of a person or a background or the like. If the image processing section 111 has a face detecting section for detecting the face on the basis of the image data, the detection result of this face detecting section or the like may be used. Moreover, a result obtained by analysis of the subject target by the image processing section 111, the microcomputer 121 and the like may be used.

When the detection information is obtained at step S48a, then, it is determined whether the target pixel is within the detection range or not (S48b). Here, it is determined whether or not the target pixel is a face portion of a person or the like.

If the target pixel is within the detection range as the result of the determination at step S48b, the inclination stabilization gradation number (stabN) is changed (S48c). For example, if the target pixel is the face portion, the inclination stabilization gradation number (stabN) is increased so as to weaken the local contrast effect.

When the inclination stabilization gradation number (stabN) is changed at step S48c, or if the target pixel is not within the detection range as the result of the determination at step S48b, step S49 and after are executed. This processing is similar to the flow in FIG. 14, and the frequency value setting of the inclination stabilization gradation and the adjacent gradation is performed by using the inclination stabilization gradation number (stabN) set at step S43 or S48c.

As described above, in the second variation of the present invention, since the inclination stabilization gradation number (stabN) is switched between the inside and the outside of the detection range, optical histogram smoothing processing can be executed for different subjects such as the face of a person and a background.

As described above, in the embodiment or the variation of the present invention, in the frequency value count of the histogram generation, the value to be added to the applicable gradation and the nearby gradation is fixed to a predetermined value (0.5, for example), while the remaining (0.5, for example) is distributed to the two gradations adjacent to the fixed gradation in accordance with the relative pixel position of the count target in the applicable gradation (see S79 to S87 in FIG. 11, for example). Thus, the histogram does not change rapidly any longer, and a result of the histogram smoothing can be stably changed.

In the embodiment or the variation of the present invention, the histogram smoothing processing is executed to the pixel value of the reduced image. However, this is not limiting, and the histogram smoothing processing may be naturally executed directly to the image data from the imaging element 102.

Moreover, in each of the embodiments of the present invention, the image processing section 111, the AE processing section 113, the AF processing section 115, and the JPEG processing section 117 are constituted by hardware (hardware circuit) separate from the microcomputer 121, but a part of or the whole of each section may be naturally configured by software and executed by the microcomputer 121. Moreover, processing by software may be naturally processed by hardware.

Moreover, in this embodiment, a digital camera is used in description as equipment for photographing, but a digital single-lens reflex camera or a compact digital camera may be used as a camera, or a camera for moving image such as a video camera or a movie camera may be also used, and moreover, a camera built in a mobile phone, a smart phone, a personal digital assist (PDA), a personal computer (PC), a tablet-type computer, a game machine or the like may be also used. In any case, the present invention can be applied to any device as long as it applies smoothing processing to the image data.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image processing apparatus comprising:
   a histogram generating section which generates a histogram by adding a value of less than 1 to a gradation and adjacent gradations thereof to which a pixel value, constituting input image data, belongs as a brightness distribution of the input image data;
   a distribution processing section which calculates a distribution amount in accordance with the pixel value and which distributes the distribution amount when adding the value of less than 1 to the gradation and the adjacent gradations thereof to which the pixel value belongs, to generate the histogram;
   a cumulative histogram generating section which generates a cumulative histogram by accumulating a plurality of histograms generated by the histogram generating section from a low gradation side; and
   a gradation correction processing section which performs contrast correction on the input image data by using the cumulative histogram, wherein
   in the distribution processing section, a predetermined number of gradations including the gradations to which the pixel value belongs are set to a stabilization gradation, and the distribution amount distributed to the stabilization gradation is fixed.

2. An imaging apparatus comprising:
   an imaging section for imaging a field and outputting image data;
   a histogram generating section which generates a histogram by adding a value of less than 1 to a gradation and adjacent gradations thereof to which a pixel value, constituting input image data, belongs as a brightness distribution of the input image data;
   a distribution processing section which calculates a distribution amount in accordance with the pixel value and which distributes the distribution amount when adding the value of less than 1 to the gradation and the adjacent gradations thereof to which the pixel value belongs, to generate the histogram;
   a cumulative histogram generating section which generates a cumulative histogram by accumulating a plurality of histograms generated by the histogram generating section from a low gradation side; and
   a gradation correction processing section which performs contrast correction on the input image data by using the cumulative histogram, wherein
   in the distribution processing section, a predetermined number of gradations including the gradations to which the pixel value belongs are set to a stabilization gradation, and the distribution amount distributed to the stabilization gradation is fixed.

3. The imaging apparatus according to claim 2, wherein if an imaging operation of the imaging section is photographing of a still image, the distribution processing section makes the gradation number for which the distribution amount is fixed equal to or smaller than the case of photographing of a moving image.

4. The imaging apparatus according to claim 2, further comprising:
   a detecting section for obtaining an area in an image; and
   an area determining section for determining whether a local area of the image data is in the area detected by the detecting section, wherein
   the histogram generating section generates a histogram for each local region of the image data; and
   the distribution processing section, if it is determined by the area determining section that the local area is in the area, changes the gradation number for which the distribution amount is fixed.

5. The imaging apparatus according to claim 2, wherein the distribution processing section distributes the fixed distribution amount so as to be "W1=1/(stabN+1)" by using the target gradation number.

6. The imaging apparatus according to claim 5, wherein in the distribution processing section, a maximum amount of the distribution amount varied in accordance with a pixel value is as follows by using the fixed distribution amount and the gradation number for fixed distribution:

$$W23=1-(W1 \times stabN)$$

where
W23: distribution weighting coefficient
W1: distribution weighting coefficient
stabN: gradation number.

7. The imaging apparatus according to claim 2, wherein in the distribution processing section, the distribution amount is varied in accordance with a pixel value and is distributed to a gradation adjacent to the gradation for which the distribution amount is fixed.

8. The imaging apparatus according to claim 7, wherein in the distribution processing section, a maximum amount of the distribution amount varied in accordance with a pixel value is as follows by using the fixed distribution amount and the gradation number for fixed distribution:

$$W23=1-(W1 \times stabN)$$

where
W23: distribution weighting coefficient
W1: distribution weighting coefficient
stabN: gradation number.

9. An image processing method comprising:
a histogram generating step of generating a histogram by adding a value of less than 1 to a gradation and adjacent gradations thereof to which a pixel value, constituting input image data, belongs as a brightness distribution of the input image data;
a distribution processing step of calculating a distribution amount in accordance with the pixel value and distributing the distribution amount when adding the value of less than 1 to the gradation and the adjacent gradations thereof to which the pixel value belongs, to generate the histogram;
a cumulative histogram generating step of generating a cumulative histogram by accumulating a plurality of histograms generated by the histogram generating step from a low gradation side; and
a gradation correction processing step of performing contrast correction on the input image data by using the cumulative histogram, wherein
in the distribution processing step, a predetermined number of gradations including the gradations to which the pixel value belongs are set to a stabilization gradation, and the distribution amount distributed to the stabilization gradation is fixed.

10. A non-transitory computer-readable medium storing a computer program for an image processing apparatus, the computer program comprising:
a histogram generating step of generating a histogram by adding a value of less than 1 to a gradation and adjacent gradations thereof to which a pixel value, constituting input image data, belongs as a brightness distribution of the input image data;
a distribution processing step of calculating a distribution amount in accordance with the pixel value and distributing the distribution amount when adding the value of less than 1 to the gradation and the adjacent gradations thereof to which the pixel value belongs, to generate the histogram;
a cumulative histogram generating step of generating a cumulative histogram by accumulating a plurality of histograms generated by the histogram generating step from a low gradation side; and
a gradation correction processing step of performing contrast correction on the input image data by using the cumulative histogram, wherein
in the distribution processing step, a predetermined number of gradations including the gradations to which the pixel value belongs are set to a stabilization gradation, and the distribution amount distributed to the stabilization gradation is fixed.

11. The image processing apparatus of claim 1, wherein the contrast correction performed on the input image data weakens or reinforces a local contrast effect on the input image data based on the fixed value.

12. The imaging apparatus of claim 2, wherein the contrast correction performed on the input image data weakens or reinforces a local contrast effect on the input image data based on the fixed value.

13. The image processing method of claim 9, wherein the contrast correction performed on the input image data weakens or reinforces a local contrast effect on the input image data based on the fixed value.

14. The non-transitory computer-readable medium of claim 10, wherein the contrast correction performed on the input image data weakens or reinforces a local contrast effect on the input image data based on the fixed value.

15. The image processing apparatus of claim 1, wherein the contrast correction performed on the input image data provides continuity on a boundary where regions defining pixel blocks of the input image data switch.

16. The imaging apparatus of claim 2, wherein the contrast correction performed on the input image data provides continuity on a boundary where regions defining pixel blocks of the input image data switch.

17. The image processing method of claim 9, wherein the contrast correction performed on the input image data provides continuity on a boundary where regions defining pixel blocks of the input image data switch.

18. The non-transitory computer-readable medium of claim 10, wherein the contrast correction performed on the input image data provides continuity on a boundary where regions defining pixel blocks of the input image data switch.

* * * * *